(12) United States Patent
Matsui et al.

(10) Patent No.: US 11,016,286 B2
(45) Date of Patent: May 25, 2021

(54) LIGHT BEAM IRRADIATION DEVICE

(71) Applicant: HAMAMATSU PHOTONICS K.K., Hamamatsu (JP)

(72) Inventors: Yoshinori Matsui, Hamamatsu (JP); Haruyoshi Toyoda, Hamamatsu (JP); Munenori Takumi, Hamamatsu (JP); Kazutaka Suzuki, Hamamatsu (JP); Kazuhiro Nakamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 346 days.

(21) Appl. No.: 16/061,465

(22) PCT Filed: Dec. 7, 2016

(86) PCT No.: PCT/JP2016/086407
§ 371 (c)(1),
(2) Date: Jun. 12, 2018

(87) PCT Pub. No.: WO2017/104510
PCT Pub. Date: Jun. 22, 2017

(65) Prior Publication Data
US 2020/0264426 A1   Aug. 20, 2020

(30) Foreign Application Priority Data

Dec. 14, 2015   (JP) .............................. JP2015-243079

(51) Int. Cl.
*G02B 26/08* (2006.01)
(52) U.S. Cl.
CPC .................. *G02B 26/0833* (2013.01)
(58) Field of Classification Search
CPC .... G02B 26/00; G02B 26/08; G02B 26/0816; G02B 26/0825; G02B 26/0833;
(Continued)

(56) References Cited

U.S. PATENT DOCUMENTS

2004/0042000 A1    3/2004   Mehrl et al.
2004/0240017 A1*  12/2004   Kandori ............. G02B 26/0816
                                                    359/196.1
2010/0067927 A1*   3/2010   Satoh ................... G03G 15/043
                                                    399/32

FOREIGN PATENT DOCUMENTS

CN          1667377 A      9/2005
CN          1742191 A      3/2006
(Continued)

OTHER PUBLICATIONS

International Preliminary Report on Patentability dated Jun. 28, 2018 for PCT/JP2016/086407.

*Primary Examiner* — Robert E. Tallman
(74) *Attorney, Agent, or Firm* — Faegre Drinker Biddle & Reath LLP

(57) ABSTRACT

A light beam irradiation device includes a light source unit that emits a light beam, a reflection mirror and a driving unit that swings the reflection mirror under supply of a driving signal, and comprises the light deflection unit receiving and reflecting the light beam emitted from the light source unit using the reflection mirror, a light deflection angle detection unit that includes a light reception surface that receives the light beam reflected by the reflection mirror, the light deflection angle detection unit detecting a position of the light beam on the light reception surface at a frequency equal to or higher than four times a resonance frequency of the light deflection unit and outputting a detection signal indicating the position, and an operation control unit that corrects the driving signal on the basis of the detection signal and outputs the corrected driving signal to the light deflection unit.

9 Claims, 28 Drawing Sheets

(58) Field of Classification Search
CPC .... G02B 26/10; G02B 26/101; G02B 26/127; G02B 27/0031
See application file for complete search history.

(56) References Cited

FOREIGN PATENT DOCUMENTS

| | | |
|---|---|---|
| CN | 102394469 A | 3/2012 |
| JP | 2006-279888 A | 10/2006 |
| JP | 2009-3165 A | 1/2009 |
| JP | 2009-98178 A | 5/2009 |
| JP | 2010-72182 A | 4/2010 |
| JP | 2010-92018 A | 4/2010 |
| JP | 2015-141372 A | 8/2015 |
| WO | WO-2014/053659 A1 | 4/2014 |

* cited by examiner

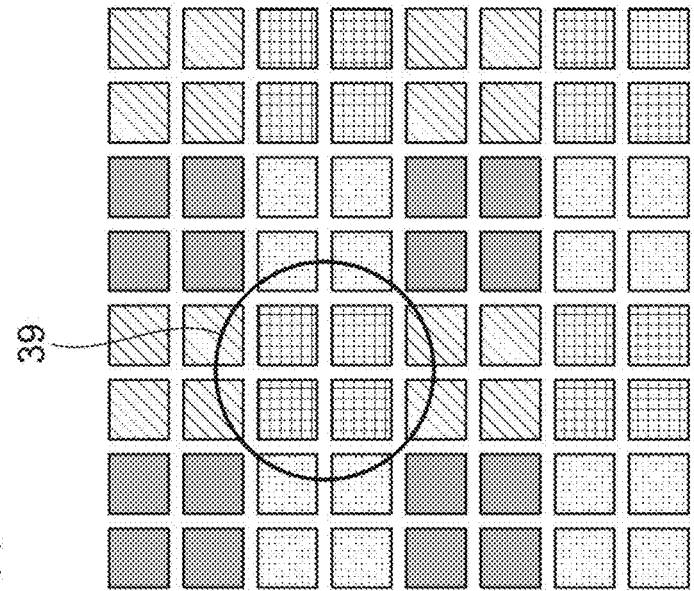
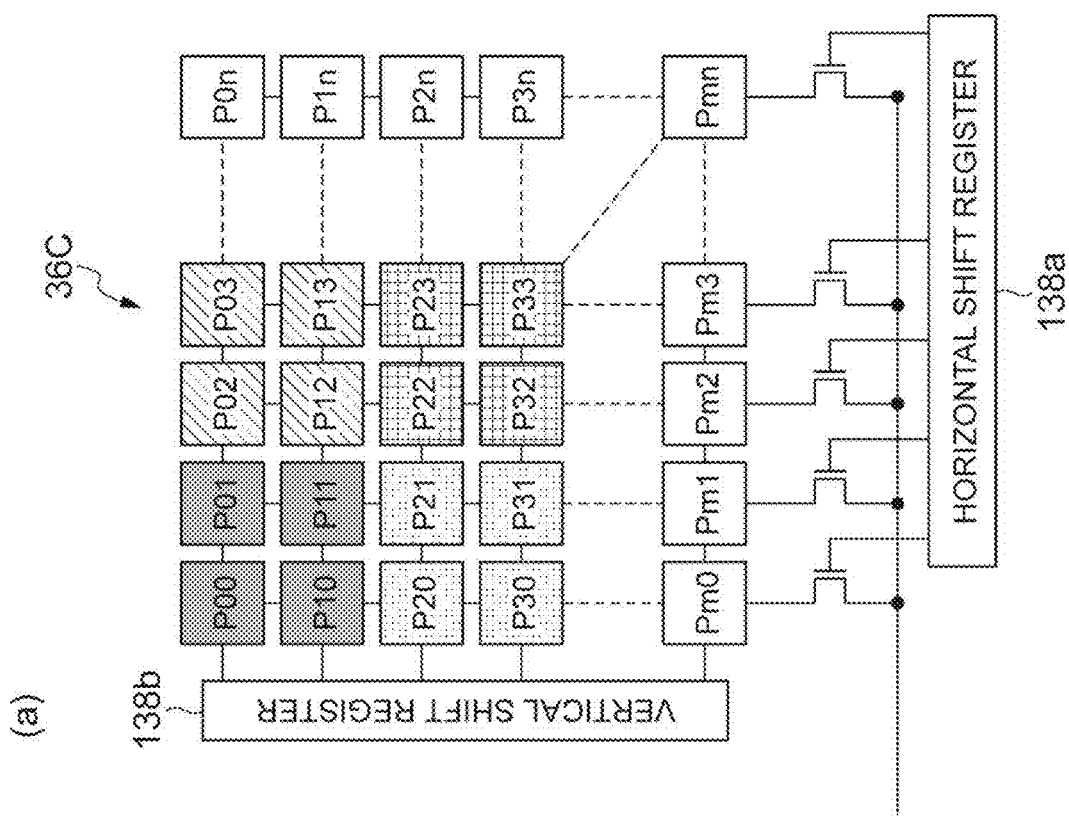
Fig. 24

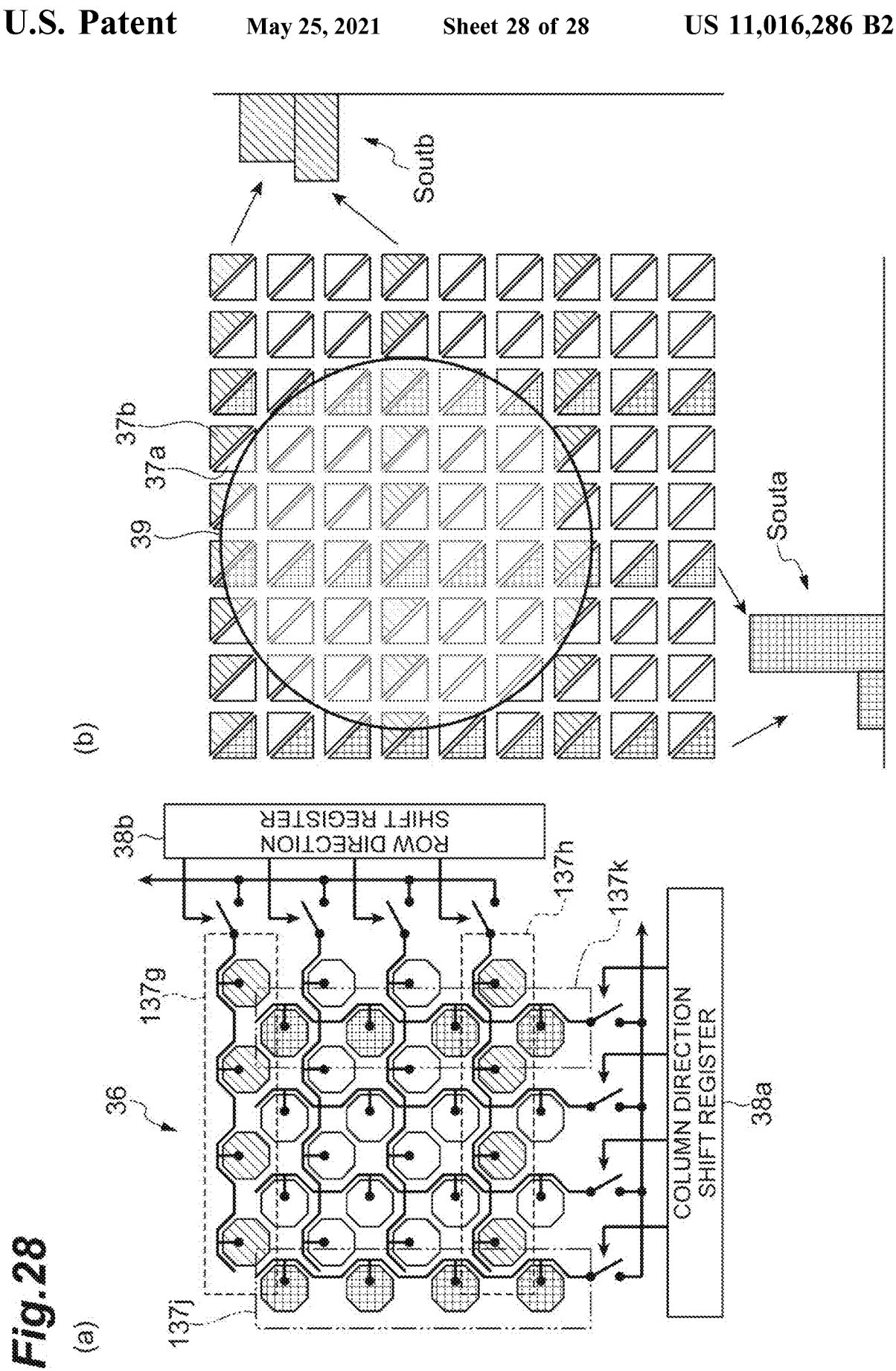

LIGHT BEAM IRRADIATION DEVICE

TECHNICAL FIELD

One aspect of the present invention relates to a light beam irradiation device for radiating a light beam.

BACKGROUND ART

In the related art, a light beam irradiation device that radiates a light beam at a desired angle has been realized. For example, Patent Literature 1 below discloses an optical space transmission device on which a micro electro mechanical system (MEMS) mirror is mounted. In order to suppress resonance vibration of the MEMS mirror, this device has a function of generating a compensation signal for canceling the resonance vibration and controlling a deflection angle of the MEMS mirror using a driving signal obtained by adding the compensation signal to a position near a change point.

CITATION LIST

Patent Literature

[Patent Literature 1] Japanese Unexamined Patent Publication No. 2006-279888

SUMMARY OF INVENTION

Technical Problem

In the optical space transmission device of the related art described above, a frequency (resonance frequency) of the resonance vibration changes variously according to characteristics of a deflection angle variable mirror such as the MEMS mirror. In such a case, in the optical space transmission device of the related art, it is difficult to sufficiently suppress a variation in an irradiation angle of the light beam to correspond to the resonance frequency.

The present invention has been made in view of the above problems, and an object of the present invention is to provide a light beam irradiation device capable of sufficiently suppressing a variation in an irradiation angle of a light beam.

Solution to Problem

In order to solve the above problem, a light beam irradiation device according to an aspect of the present invention includes a light source configured to emit light; a light reflection unit including a reflection mirror and a driving unit for swinging the reflection mirror under supply of a driving signal, the light reflection unit receiving and reflecting the light emitted from the light source using the reflection mirror; a position detection unit including a light reception surface receiving the light reflected by the reflection mirror, the position detection unit detecting a position of the light on the light reception surface at a frequency equal to or higher than four times a resonance frequency of the light reflection unit and outputting a detection signal indicating the position; and a correction unit for correcting the driving signal on the basis of the detection signal and outputs the corrected driving signal to the light reflection unit.

According to the light beam irradiation device according to the above aspect of the present invention, the light beam emitted from the light source is reflected by the light reflection unit and radiated. In this case, the driving signal is supplied to the driving unit that swings the reflection mirror of the light reflection unit, such that the deflection angle of the light reflection unit is controlled to be a predetermined angle and an irradiation angle of the light beam is set to a desired angle. At the same time, a light reception position of the light beam on the light reception surface is detected at a frequency equal to or higher than four times the resonance frequency of the light reflection unit by the position detection unit, and the driving signal supplied to the driving unit is corrected on the basis of a result of the detection. Accordingly, it is possible to correct the irradiation angle of the light beam while following the resonance vibration of the reflection mirror. As a result, it is possible to sufficiently suppress a variation in the irradiation angle of the light beam. Furthermore, it is possible to control the irradiation of the light beam to be a desired angle with high accuracy by sufficiently suppressing the variation in the irradiation angle of the light beam.

Advantageous Effects of Invention

According to one aspect of the present invention, the variation in the irradiation angle of the light beam can be sufficiently suppressed.

BRIEF DESCRIPTION OF DRAWINGS

FIG. 24 is a schematic diagram illustrating a principle of binning readout controlled by the light deflection angle detection control unit 7 in FIG. 21.

FIG. 28 is a schematic diagram illustrating a principle of skipping readout controlled by the light deflection angle detection control unit 7 in FIG. 21.

DESCRIPTION OF EMBODIMENTS

Figure 1:
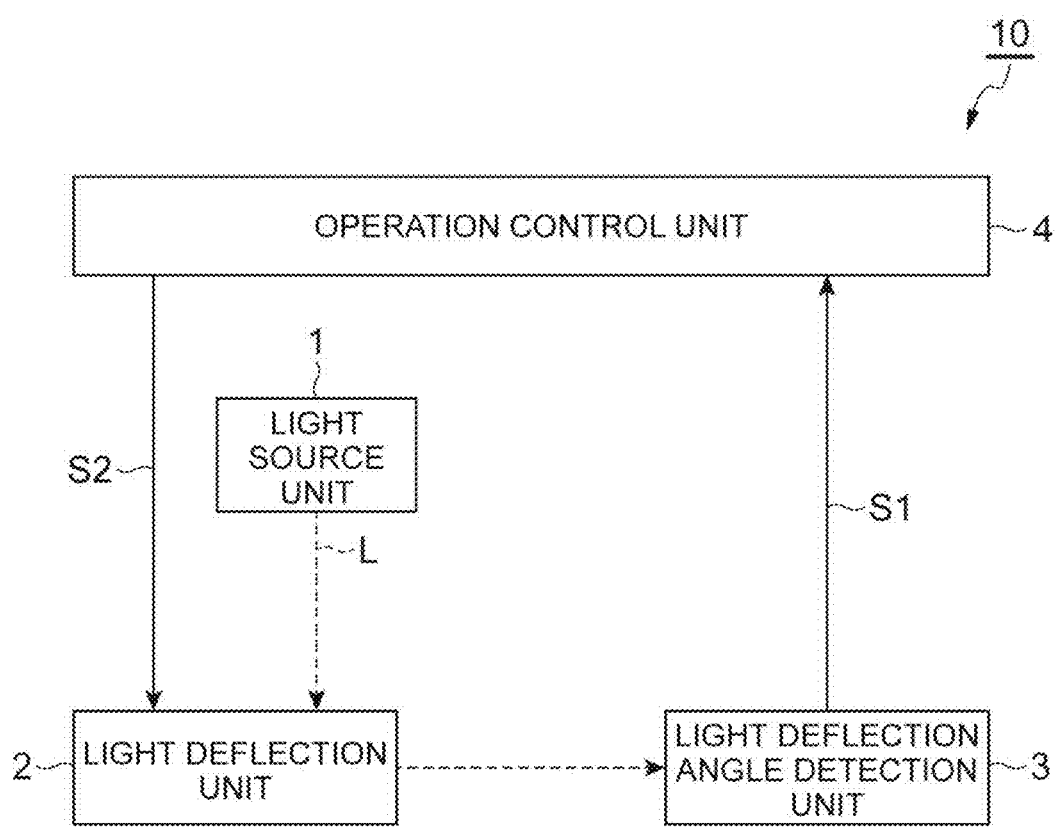
FIG. 1 is a schematic configuration diagram illustrating a light beam irradiation device according to a first embodiment of the present invention.

Hereinafter, embodiments of the present invention will be described in detail with reference to the accompanying drawings. It should be noted that, in the description, the same elements or elements having the same functions are denoted with the same reference numerals, and duplicate description will be omitted.

First, an overview of a light beam irradiation device according to an embodiment of the present invention will be described. FIG. 1 is a schematic configuration diagram of a light beam irradiation device 10 according to this embodiment. The light beam irradiation device 10 is a device capable of high-speed driving for radiating a light beam at a desired angle, and includes a light source unit (a light source) 1 that emits a light beam L, a light deflection unit (a light reflection unit) 2 that reflects the light beam L emitted from a light source unit 1 at a desired deflection angle, a light deflection angle detection unit (a position detection unit) 3 that detects the deflection angle of the light beam L reflected by the light deflection unit 2, and an operation control unit (a correction unit) 4 that controls an operation of the light deflection unit 2. The light deflection angle detection unit 3 and the operation control unit 4 are electrically connected to each other by the signal line S1, and the light deflection unit 2 and the operation control unit 4 are electrically connected to each other by a signal line S2. The signal line S1 is provided to output a light deflection angle signal $S_{angle}$ (to be described below) detected in the light deflection angle detection unit 3 to the operation control unit 4. Further, the signal line S2 is provided to output a light deflection angle control signal $S_{ctrl}$ (to be described below) that is generated by the operation control unit 4 to the light deflection unit 2.

The light source unit 1 is a light source device capable of generating and radiating a light beam L that is parallel light or a light beam L that is focused on the light deflection unit 2 and includes, for example, a laser diode (LD) element and a collimating lens. In addition, the light source unit 1 may be configured by combining another light emitting element such as a light emitting diode (LED) and an optical device such as a lens. In the light source unit 1, a spot diameter, irradiation intensity, and an operation distance in the light beam L which is parallel light to be generated and radiated or a light beam L focused on the light deflection unit 2 are adjusted in advance to an optimal state in each part of the light deflection unit 2 and the light deflection angle detection unit 3. One or more means or mechanisms for adjusting or controlling the spot diameter, the irradiation intensity, and the operation distance in the light beam L which is parallel light or the light beam L focused on the light deflection unit 2 to arbitrary values may be included in the light source unit 1.

The light deflection unit 2 deflects the light beam L radiated from the light source unit 1 in a first direction and a second direction crossing to the first direction. For example, a micro electro mechanical system (MEMS) mirror, which is a small mirror device constituted by a microelectromechanical element, is adopted as the light deflection unit 2. By adopting the MEMS mirror, it becomes possible to change an angle of the mirror that reflects the light beam L at an arbitrary angle at high speed.

Figure 2:
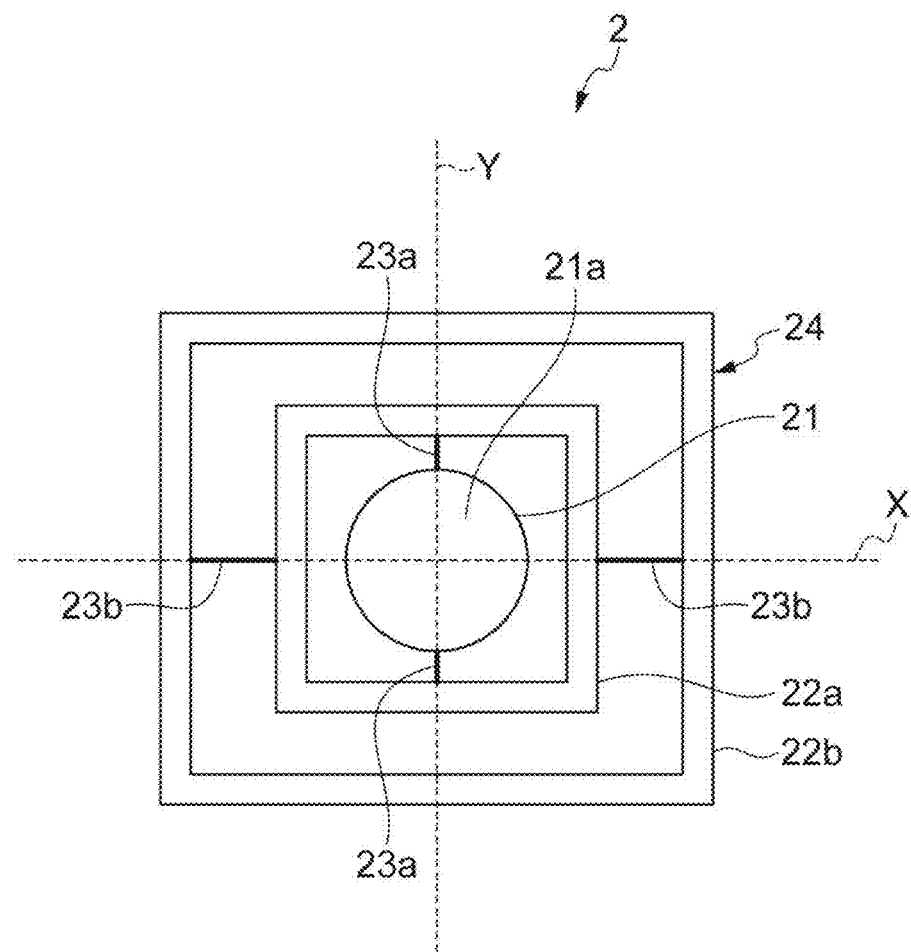
FIG. 2 is a plan view illustrating main parts of a driving unit of a light deflection unit 2 of FIG. 1 realized by an MEMS mirror.

FIG. 2 is a plan view illustrating an example of a representative configuration in main parts of a driving unit of the light deflection unit 2 that is realized by the MEMS mirror. In the following description, a general two-dimensional circular MEMS mirror will be assumed to be used in the driving unit of the light deflection unit 2 in FIG. 2. Further, a shape of the MEMS mirror that is used in the driving unit of the light deflection unit 2 may be circular, rectangular, square, or another shape. This light deflection unit 2 includes a reflection mirror 21 which receives the light beam L radiated from the light source unit 1, and a driving unit 24 including two rectangular coils 22a and 22b and two swing shafts (elastic bodies) 23a and 23b. The reflection mirror 21 is supported by the coil 22a from the outside via the swing shaft 23a formed of an elastic body such as a spring. In addition, the reflection mirror 21 and the coil 22a can be integrally swung using the swing shaft 23a as a rotation shaft. Furthermore, the coil 22a is supported by the coil 22b from the outside through the swing shaft 23b constituted by the elastic body such as a spring, which crosses the swing shaft 23a. The reflection mirror 21 and the coils 22a and 22b can be integrally swung using the swing shaft 23b as a rotation shaft. In addition, a strong magnet (not illustrated) is included under the coils 22a and 22b.

In the light deflection unit 2 having the above configuration, the light deflection angle control signal (driving signal) $S_{ctrl}$ is supplied from the operation control unit 4 to each of the coils 22a and 22b. This light deflection angle control signal $S_{ctrl}$ is supplied as a voltage signal or a current signal via the signal line S2 (FIG. 1). In the light deflection unit 2, a current corresponding to the light deflection angle control signal $S_{ctrl}$ individually flows in each of the coil 22a and the coil 22b disposed in a strong magnetic field generated by the strong magnet due to the supply of the light deflection angle control signal. $S_{ctrl}$, and therefore Lorentz force is generated in each of the coil 22a and the coil 22b. Due to an action of the Lorentz force, the reflection mirror 21 is swung about the swing shaft 23b (an X direction) and the swing shaft 23a (a Y direction) serving as a rotation shaft. In this case, a direction of the swing angle and the magnitude of the swing angle in the swing shaft 23a and the swing shaft 23b can be individually adjusted by controlling the light deflection angle control signal $S_{ctrl}$. Accordingly, the light deflection unit 2 reflects the light beam L radiated by the light source unit 1 in the X direction and the Y direction using the reflection mirror 21, such that the light beam L can be output with a two-dimensional spread in the X direction and the Y direction.

Figure 3:
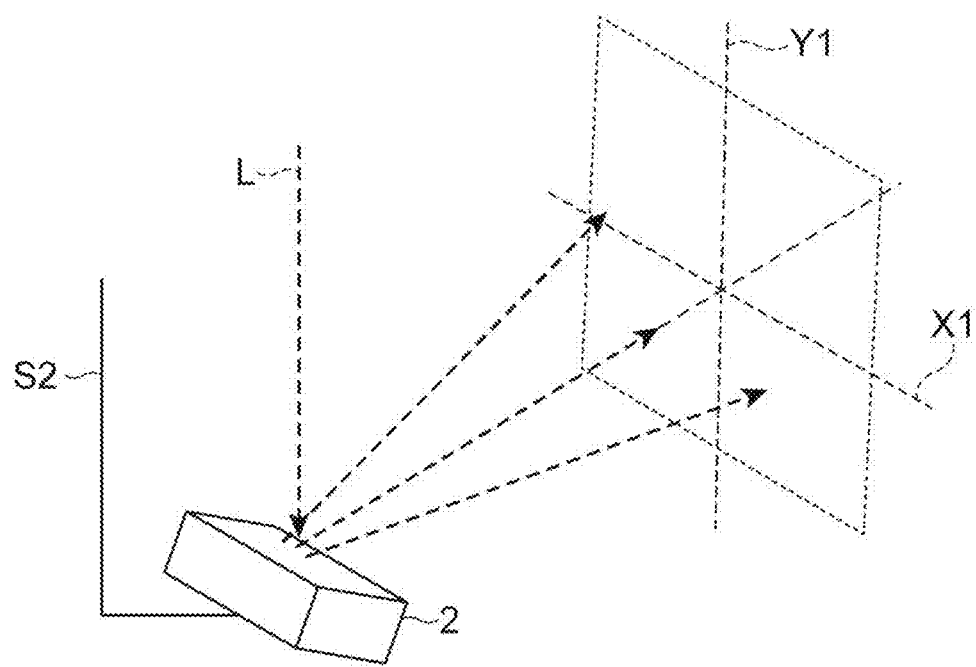
FIG. 3 is a perspective view illustrating a reflected state of a light beam L by the light deflection unit 2 of FIG. 1.

FIG. 3 is a perspective view illustrating a reflected state of the light beam L reflected by the light deflection unit 2. As illustrated in FIG. 3, the light deflection unit 2, which can two-dimensionally swing, is driven to reflect the light beam L radiated from the light source unit 1 through non-resonance driving in an X1 direction on a predetermined plane in a two-dimensional space and an Y1 direction perpendicular to the X1 direction on the predetermined plane. A resonance frequency at the time of driving the light deflection unit 2 is determined according to characteristics such as an elastic coefficient of the swing shafts 23a and 23b including an elastic body, characteristics such as a material or a shape of members such as the reflection mirror 21 and the coils 22a and 22b, or environmental conditions such as temperature or humidity.

Figure 4:
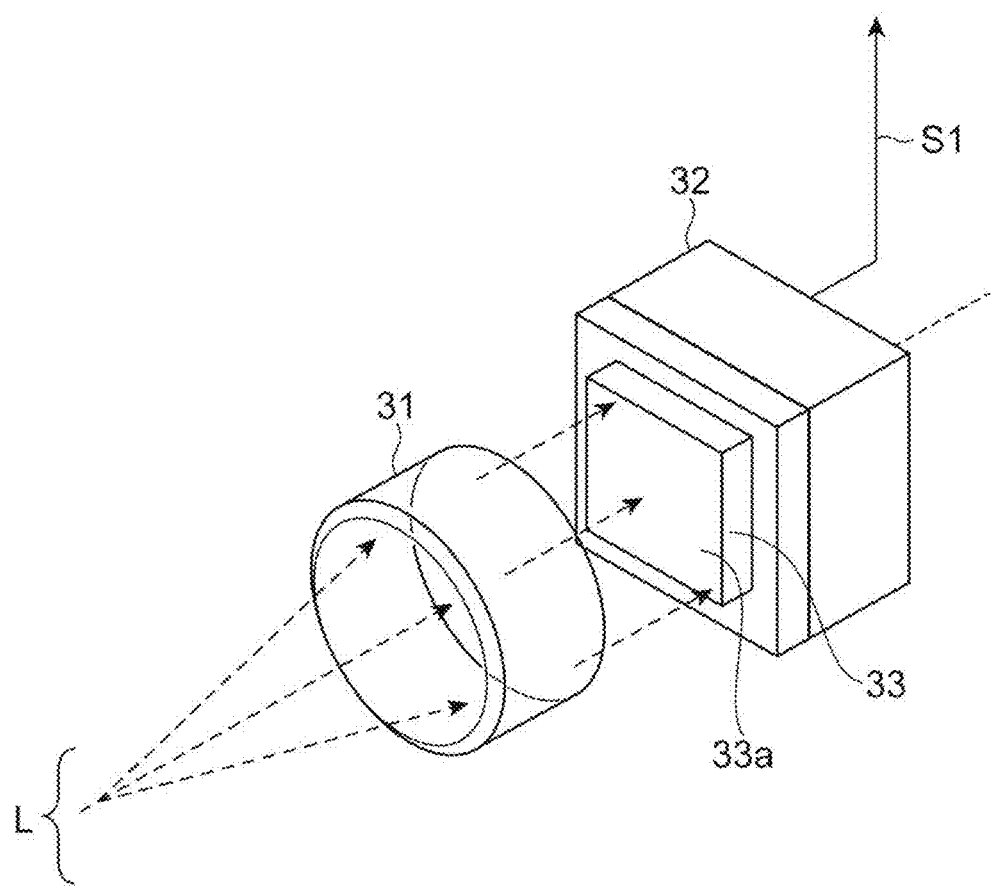
FIG. 4 is a perspective view illustrating a configuration of a light deflection angle detection unit 3 of FIG. 1.
Figure 5:
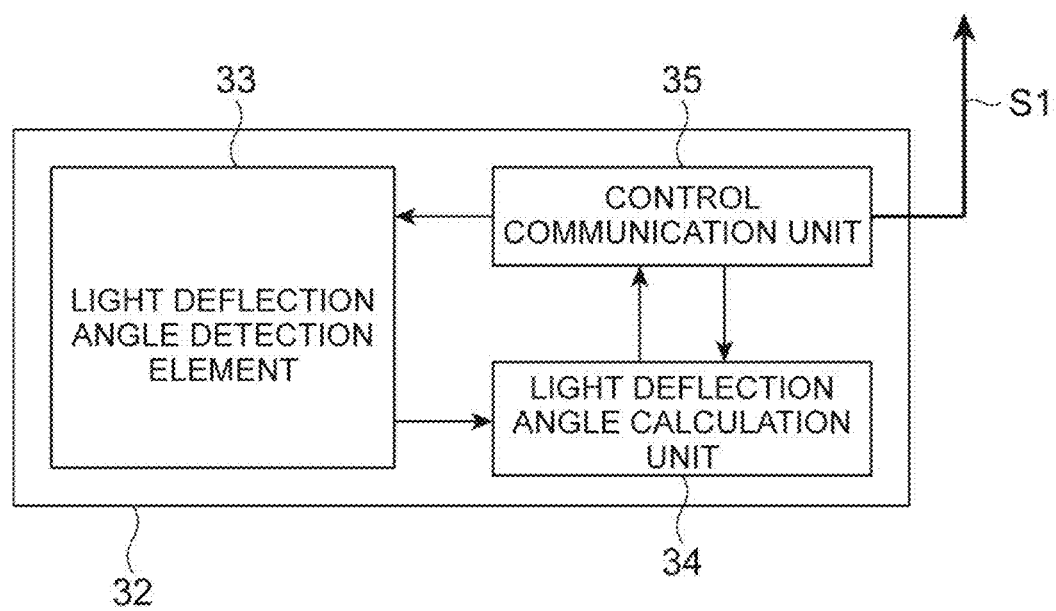
FIG. 5 is a block diagram illustrating a functional configuration of a light deflection angle detection module 32 in FIG. 4.

FIG. 4 is a perspective view illustrating a configuration of the light deflection angle detection unit 3, and FIG. 5 is a block diagram illustrating a functional configuration of the light deflection angle detection module 32 in FIG. 4. As illustrated in FIG. 4, the light deflection angle detection unit 3 is a unit that detects the deflection angle of the two-dimensionally deflected light beam L, and includes a lens unit 31 and a light deflection angle detection module 32. The signal line S1 for outputting the light deflection angle signal $S_{angle}$ to the operation control unit 4 is electrically connected to this light deflection angle detection module 32. The light deflection angle detection unit 3 is configured to be able to detect the deflection angle of the light beam L over an entire movable range of the reflection mirror 21 in the light deflection unit 2. The light deflection angle detection unit 3 is configured to be able to detect the light deflection angle at a frequency that is equal to or higher than four times the resonance frequency of the light deflection unit 2 described above.

The lens unit 31 is a light transfer means for transferring the light beam L deflected in the X1 direction and the Y1 direction by the light deflection unit 2 to the light deflection angle detection module 32 without loss. This lens unit 31 may have a configuration in which lenses having optimal performance are selected to transfer the light beam L to the light deflection angle detection module 32 without loss and a plurality of lenses are combined or may be constituted by one lens. It should be noted that the lens unit 31 may be omitted, for example, to miniaturize the device, and in this case, the light beam L may be directly incident on the light deflection angle detection module 32.

The light deflection angle detection module 32 includes a light deflection angle detection element 33, a light deflection angle calculation unit 34, and a control communication unit 35. The light deflection angle detection element 33 is a photodetector including a plurality of pixels in which photodetection elements outputting luminance information as a numerical value for each pixel are arranged one-dimensionally or two-dimensionally. Examples of the photodetector include an area sensor, a linear sensor, and an optical sensor. The light deflection angle detection element 33 includes a light reception surface 33a which receives the light beam L reflected by the light deflection unit 2 and detects a light reception position of the light beam L on the light reception surface 33a and outputs a detection signal indicating the light reception position to the light deflection angle calculation unit 34. The light deflection angle calculation unit 34 includes an arithmetic circuit such as a microprocessor built thereinto and calculates the deflection angle of the light beam L using a predetermined calculation algorithm on the basis of the detection signal output from the light deflection angle detection element 33 to generate a light deflection angle signal $S_{angle}$ indicating the deflection angle. The control communication unit 35 controls the operations of the light deflection angle detection element 33 and the light deflection angle calculation unit 34 and receives the light deflection angle signal $S_{angle}$ from the light deflection angle calculation unit 34 to transmit the light deflection angle signal $S_{angle}$ to the operation control unit 4 via the signal line S1.

In the light beam irradiation device 10 of the embodiment, the light deflection angle detection unit 3 is required to perform measurement at a high speed and with high accuracy over an entire control range of the light beam L in order to enable an irradiation position of the light beam L to be controlled to change from any position to any position at a high speed and with high accuracy in a predetermined control range. In view of this, a module having a sensor with a frame rate corresponding to a frequency equal to or higher than four times the resonance frequency of the light deflection unit 2 is selected as the light deflection angle detection module 32.

Furthermore, in order to control the deflection angle at a higher speed and with higher accuracy, it is preferable for the light deflection angle detection module 32 to have a frame rate corresponding to a frequency equal to or higher than five times the resonance frequency of the light deflection unit 2 and it is more preferable to have a frame rate corresponding to a frequency equal to or higher than ten times the resonance frequency of the light deflection unit 2. An example of the light deflection angle detection module 32 may include a sensor having both a one-dimensional or two-dimensional CMOS sensor and a high-speed parallel image processing unit, a sensor including a CMOS sensor for acquisition of two-dimensional projection data, or a position sensitive detector (PSD) that is an analog position detection sensor. According to the sensor including a high speed two-dimensional CMOS sensor, since the sensor has a structure in which A/D converters are arranged in parallel columns and integrated on the sensor, high speed readout can be realized.

Figure 6:
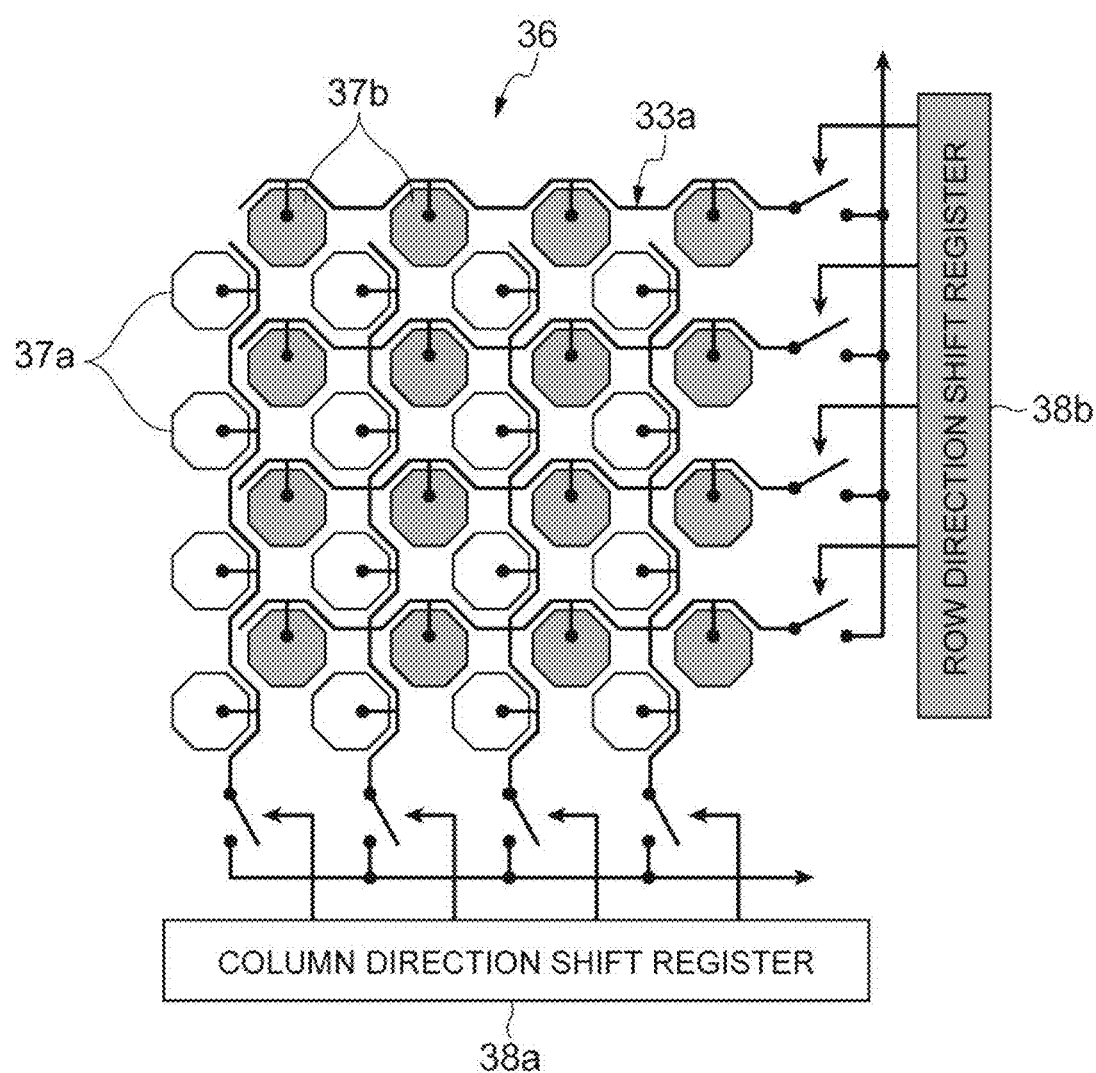
FIG. 6 is a plan view illustrating an example of a structure of a light deflection angle detection element 33 of FIG. 5.

FIG. 6 illustrates an example of a structure of the light deflection angle detection element 33 including the CMOS sensor for acquisition of two-dimensional projection data. As illustrated in FIG. 6, in the CMOS sensor 36, each of two-dimensionally arranged pixels constituting the light reception surface 33*a* is constituted by a combination of one column direction pixel 37*a* and one row direction pixel 37*b*. A plurality of column direction pixels 37*a* are connected to each other for each column and are connected to a column direction shift register 38*a* as a pixel line corresponding to one column. Similarly, the plurality of row direction pixels 37*b* are connected to each other for each row and are connected to a row direction shift register 38*b* as a pixel line corresponding to one row. With the CMOS sensor 36 having such a structure, a luminance distribution of the spot light of the light beam L incident on the light reception surface 33*a* is integrated in a column direction and a row direction and read to the column direction shift register 38*a* and the row direction shift register 38*b*. Also, an 8-bit or 10-bit digital value is serially output from the column direction shift register 38*a* and the row direction shift register 38*b* via the built-in A/D converter, and a detection signal is output as a digital signal. The luminance distribution indicated by the digital signal indicated by the detection signal output from the column direction shift register 38*a* and the row direction shift register 38*b* in this way is similar to a Gaussian distribution as obtained by projecting the spot light of the light beam L in the column direction and the row direction.

Figure 7:
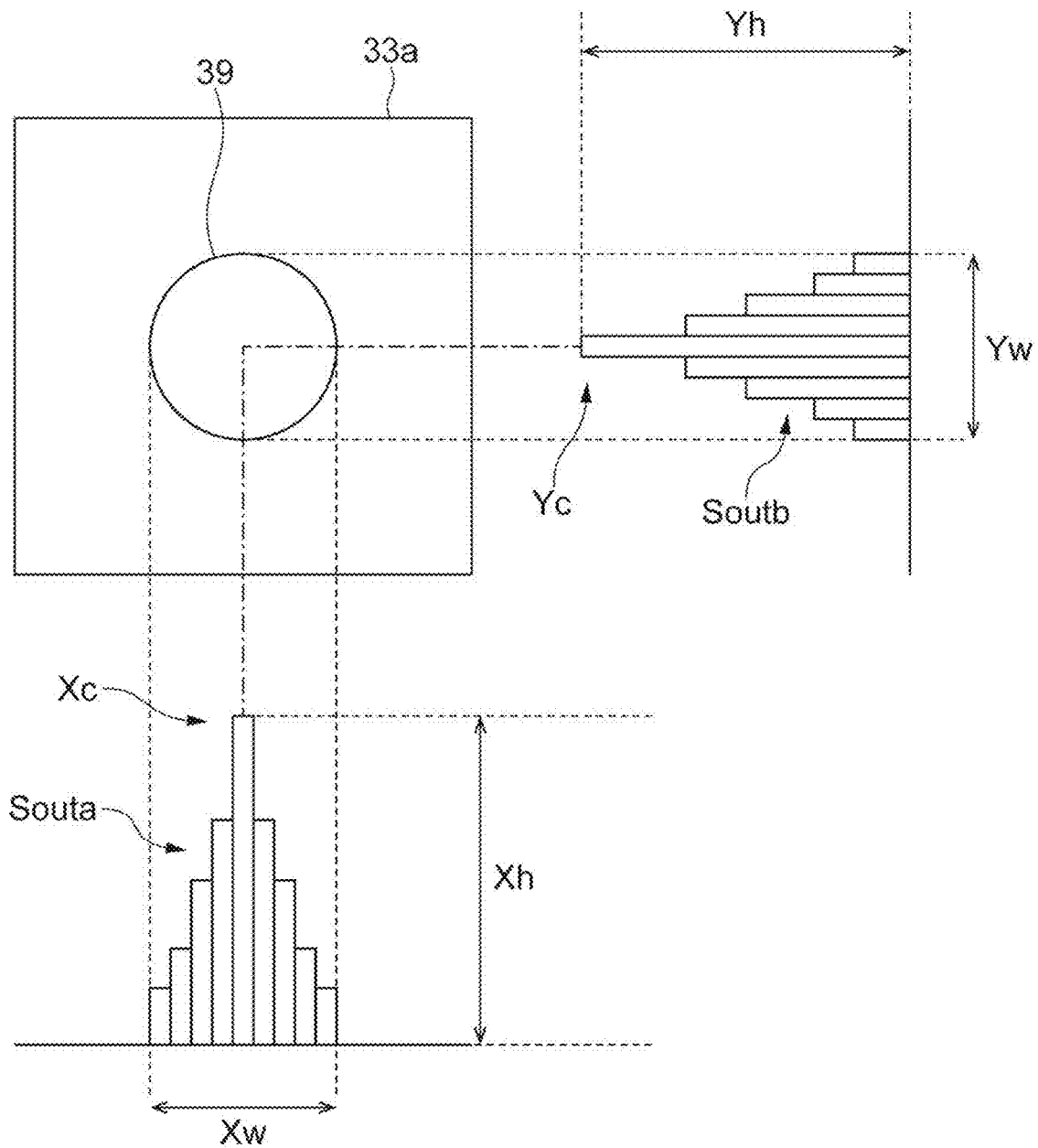
FIG. 7 is a graph showing an example of a luminance distribution of a detection signal output from a CMOS sensor of FIG. 6.

FIG. 7 illustrates an example of the luminance distribution of the detection signal output from the CMOS sensor 36 in FIG. 6. As illustrated in FIG. 7, the detection signal $S_{outa}$ and the detection signal $S_{outb}$ are output from the column direction shift register 38*a* and the row direction shift register 38*b* of the CMOS sensor 36 with respect to spot light 39 of the light beam L incident on the light reception surface 33*a*. In the detection signals $S_{outa}$ and $S_{outb}$, diameters in the row direction and the column direction of the spot light 39 on the light reception surface 33*a* appear as respective half value widths Xw and Yw. Maximum luminance values Xh and Yh of the detection signals $S_{outa}$ and $S_{outb}$ indicate a maximum luminance value of the incident spot light 39. Further, the positions Xc and Yc on the light reception surface 33*a* corresponding to the maximum luminance values Xh and Yh of the detection signals $S_{outa}$ and $S_{outb}$ indicate a two-dimensional position of the pixels in which the maximum luminance has been detected. In this case, the light deflection angle calculation unit 34 detects positions Xc and Yc on the light reception surface 33*a* corresponding to the maximum luminance values Xh and Yh in units of pixels on the basis of the detection signals $S_{outa}$ and $S_{outb}$. The light deflection angle calculation unit 34 appropriately sets a calculation area on the basis of the half-value widths Xw and Yw with respect to the two-dimensional positions Xc and Yc, and then executes one-dimensional centroid computation to thereby recalculate the two-dimensional positions Xc and Yc of the pixel with maximum luminance with accuracy of subpixel units. Further, the light deflection angle calculation unit 34 calculates the deflection angle of the light beam L on the basis of the two-dimensional positions Xc and Yc.

The CMOS sensor 36 having the above structure is the same as a combination of CMOS line sensors in a column direction and a row direction. In a typical two-dimensional CMOS sensor, when the number of pixels in the row direction is m and the number of pixels in the column direction is n (in and n are any natural numbers), the amount of output data is m×n times the amount of data of one pixel, whereas in the CMOS sensor 36, the amount of output data is m+n times the amount of data of one pixel. Therefore, it becomes possible to output two-dimensional position information of incident light at a high frame rate by adopting the CMOS sensor 36. For example, when the Profile sensor which is a high performance CMOS sensor for two-dimensional position information detection is used for the CMOS sensor 36, it is possible to directly output data at a high speed at a frame rate of a maximum of 3200 Hz (in the case of a 8-bit output mode). Also, since the amount of output data is greatly reduced, it is possible to greatly simplify a signal processing circuit at a rear stage of the sensor.

Further, the CMOS sensor 36 has an advantage that handling is easy since the sensor can be driven only by supplying the two types of signals including a driving clock signal and a start pulse signal, in addition to power supply for driving the sensor. In addition, the sensor frame rate in the CMOS sensor 36 is determined by a conversion speed of the A/D converter built into the CMOS sensor 36, and it is possible to increase the frame rate of about ten times to 100 times a current conversion speed through the improvement of the A/D converter or the like. However, when the conversion speed of the A/D converter increases, power consumption in the sensor also increases, and therefore the conversion speed of the A/D converter is appropriately selected according to a purpose.

Figure 8:
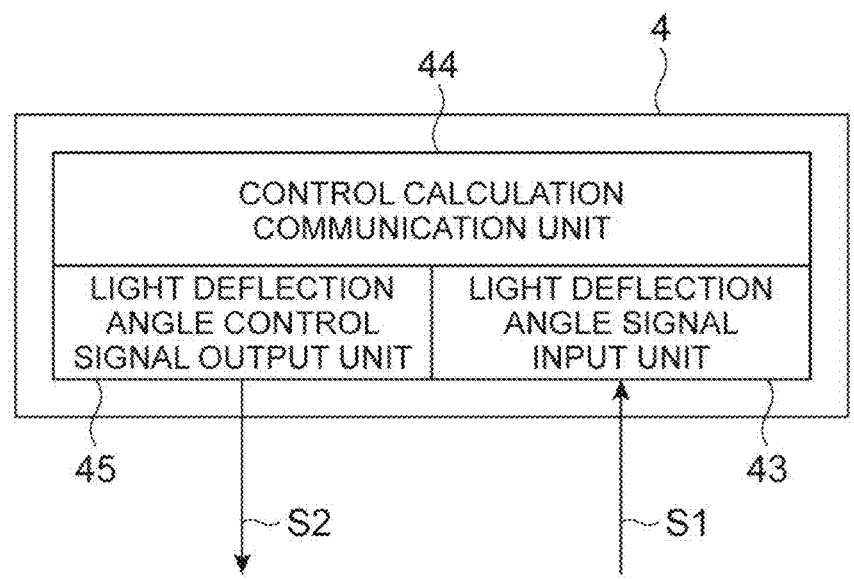
FIG. 8 is a block diagram illustrating a functional configuration of an operation control unit 4 in FIG. 1.

FIG. 8 is a block diagram illustrating a functional configuration of the operation control unit 4. As illustrated in FIG. 8, the operation control unit 4 includes a light deflection angle signal input unit 43, a control calculation communication unit 44, and a light deflection angle control signal output unit 45, and executes overall operation control of the light beam irradiation device 10. The operation control of the operation control unit 4 is repeatedly executed at a frequency equal to or higher than four times the resonance frequency of the light deflection unit 2 to correspond to the detection frequency of the light deflection angle detection unit 3. Here, it is preferable for the operation control of the operation control unit 4 to be executed at a frequency equal to or higher than five times the resonance frequency of the light deflection unit 2 to correspond to the detection frequency of the light deflection angle detection unit 3, and it is more preferable for the operation control of the operation control unit 4 to executed at a frequency equal to or higher than ten times the resonance frequency of the light deflection unit 2. The light deflection angle signal input unit 43 receives the light deflection angle signal $S_{angle}$ from the light deflection angle detection unit 3 via the signal line S1 and outputs the light deflection angle signal $S_{angle}$ to the control calculation communication unit 44. The control calculation communication unit 44 controls the light deflection angle control signal output unit 45 to correct the light deflection angle control signal $S_{ctrl}$ on the basis of the light deflection angle signal $S_{angle}$ output from the light deflection angle signal input unit 43. The light deflection angle control signal output unit 45 generates the light deflection angle control signal $S_{ctrl}$ corrected under the control of the control calculation communication unit 44 and outputs the light deflection angle control signal $S_{ctrl}$ to the light deflection unit 2 via the signal line S2. The operation control unit 4 having the above configuration may be constituted by, for example, a computer including a processor built thereinto, a signal acquisition device such as a frame grabber board, or a signal output device such as a DA board or may be constituted by, for example, a dedicated control device specialized for the operation control.

Figure 9:
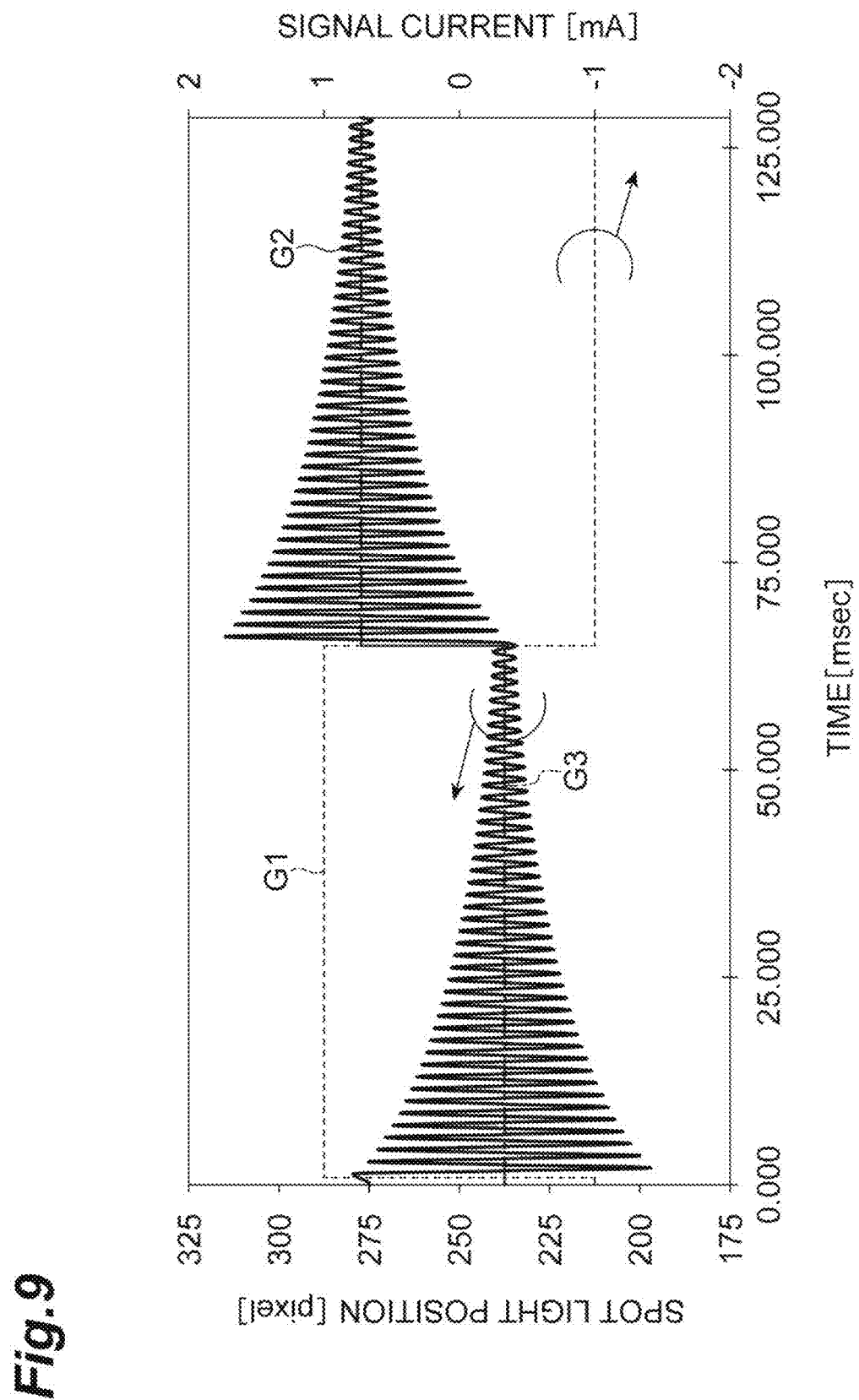
FIG. 9 is a graph showing a waveform of a light deflection angle signal $S_{angle}$ detected by the light deflection angle detection unit 3 in FIG. 1 when light deflection angle control in the light deflection unit 2 in FIG. 1 is stopped.

Next, an example of detection of the light deflection angle of the light beam L in the light deflection unit 2 and the light deflection angle detection unit 3 described above will be described. FIG. 9 is a graph showing a waveform of the light deflection angle signal $S_{angle}$ detected by the light deflection angle detection unit 3 when the light deflection unit 2 stops control of the light deflection angle. In FIG. 9, a graph G1 shows a temporal change in the light deflection angle control signal $S_{ctrl}$, a graph G2 shows a temporal change in the detected light deflection angle, and a graph G3 shows a target value of the light deflection angle. It should be noted that the light deflection angle and the target value thereof are represented by a one-dimensional position of a spot light of the light beam L detected by the light deflection angle detection module 32, and the light deflection angle control signal $S_{ctrl}$ is represented by a signal current value. In this example, a signal that changes stepwise from −1 mA to +1 mA is set as the light deflection angle control signal $S_{ctrl}$. From this result, it can be seen that in the temporal change in the detected light deflection angle, an amplitude width of the vibration is maximized at the time of switching the light deflection angle control signal $S_{ctrl}$ from −1 mA to +1 mA and indicates an attenuated vibration response in which the vibration is gradually attenuated and approaches the target value of the light deflection angle. It has been found that this attenuated vibration response is determined from spring stiffness of the swing shafts 23a and 23h constituted by an elastic body such as a spring in the light deflection unit 2 constituted by the MEMS mirror and a shape and a size of each part of the MEMS mirror, and that a duration of the vibration is about tens of milliseconds. When the MEMS mirror is used as the light deflection unit 2 as in the embodiment, the attenuated vibration response becomes a factor limiting high speed and high accuracy of the light deflection angle control. Therefore, in the embodiment, in order to suppress the attenuated vibration response and realize highly accurate light deflection angle control, the operation control unit 4 executes the suppression control process for the attenuated vibration response.

Figure 10:
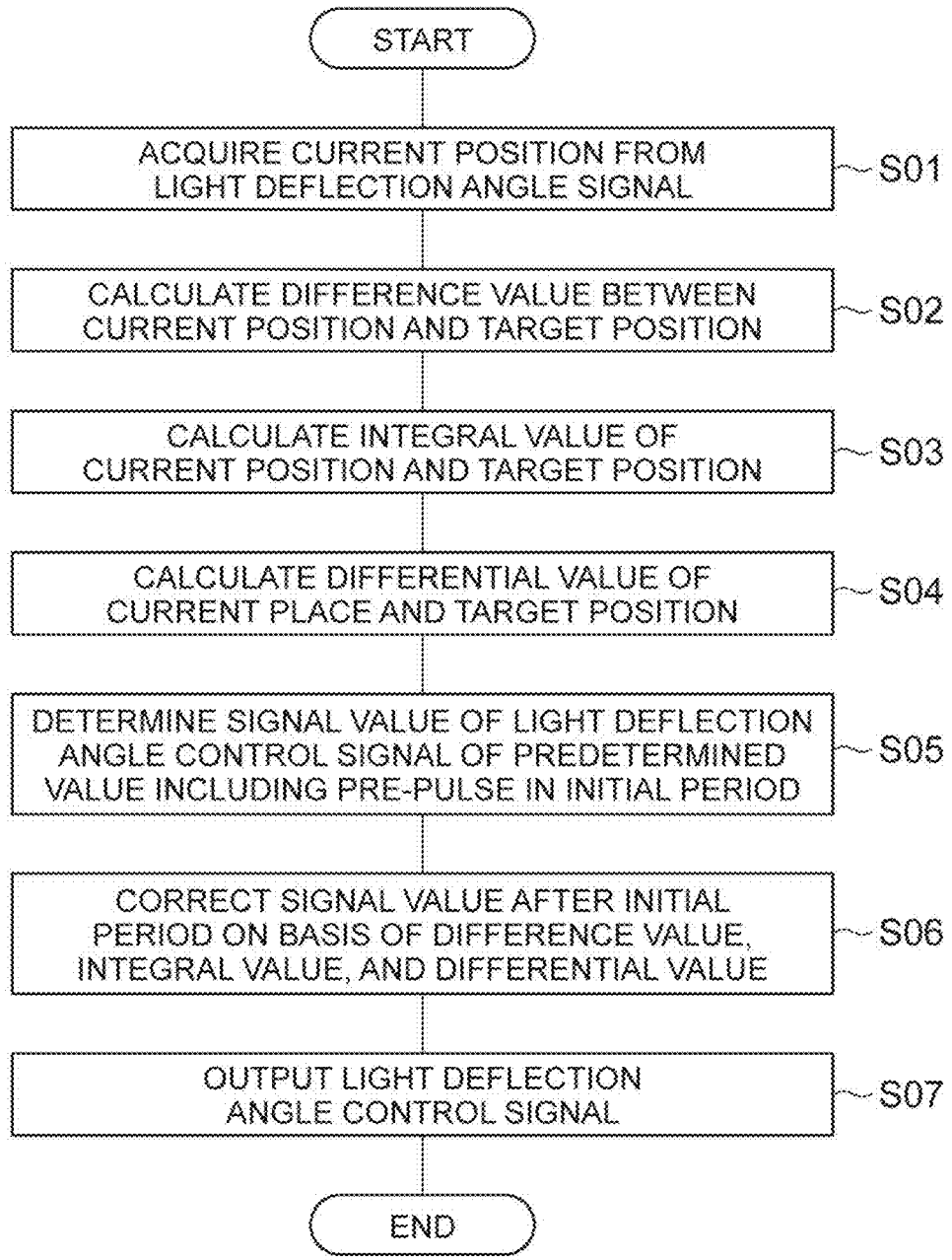
FIG. 10 is a flowchart illustrating an operation procedure of a suppression control process for an attenuated vibration response in the operation control unit 4 of FIG. 1.

Hereinafter, details of the suppression control process for the attenuated vibration response in the operation control unit 4 will be described. FIG. 10 is a flowchart illustrating an operation procedure of the suppression control process for the attenuated vibration response in the operation control unit 4.

First, when the operation control unit 4 starts the suppression control process for the attenuated vibration response, a current light deflection angle (angle information) of the light beam reflected by the light deflection unit 2 is specified from the light deflection angle signal $S_{angle}$ output from the light deflection angle detection unit 3 (step S01). This deflection angle may be represented by a position of the spot light of the light beam L or may be represented by an incidence angle of the light beam L itself. Here, an example of performing control on the basis of the position of the spot light will be described. Then, the operation control unit 4 calculates a difference value between the current position and the target position indicating the target value of the light deflection angle (step S02). The target value of the light deflection angle may be determined in advance and stored in the operation control unit 4 or the target value may be measured and set in advance as a process in a stage prior to the suppression control process for the attenuated vibration response. Further, the operation control unit 4 calculates an integral value obtained by adding the difference value between the current position and the target position to a previous difference value (step S03). The operation control unit 4 calculates a differential value by calculating a difference between the difference value between the current position and the target position and the previous difference value (step S04).

Thereafter, the operation control unit 4 determines the current signal value (a current value) of the light deflection angle control signal $S_{ctrl}$ (step S05). This signal value is determined to set a pre-pulse having a predetermined waveform in a predetermined initial period from a timing at which the light deflection angle is switched and the target value of the light deflection angle transitions and is set to a signal value corresponding to the target value after the predetermined initial period. Then, when a current timing is a timing at which an initial period in which a pre-pulse is set has elapsed, the operation control unit 4 multiplies a difference value, an integral value, and the differential value obtained in steps S02 to S04 by a coefficient, obtains a sum thereof, and executes PID control on the basis of the sum. Accordingly, the signal value of the light deflection angle control signal $S_{ctrl}$ at a current control timing is corrected from the signal value of the light deflection angle control signal $S_{ctrl}$ at a previous control timing (step S06). Although the PID control is executed here, the control may be performed using the difference value, the differential value, and the integral value individually, or the control may be performed by appropriately combining a plurality of values according to a purpose. That is, the P control using only the difference value may be executed, or the PI control using only the difference value and the integral value may be executed. Finally, the operation control unit 4 outputs the light deflection angle control signal $S_{ctrl}$ with the corrected signal value, and controls the operation of the light deflection unit 2 (step S07). The processes of steps S01 to S07 are repeatedly executed at a frequency equal to or higher than four times the resonance frequency of the light deflection unit 2 according to a detection cycle of the light deflection angle detection unit 3.

Figure 11:
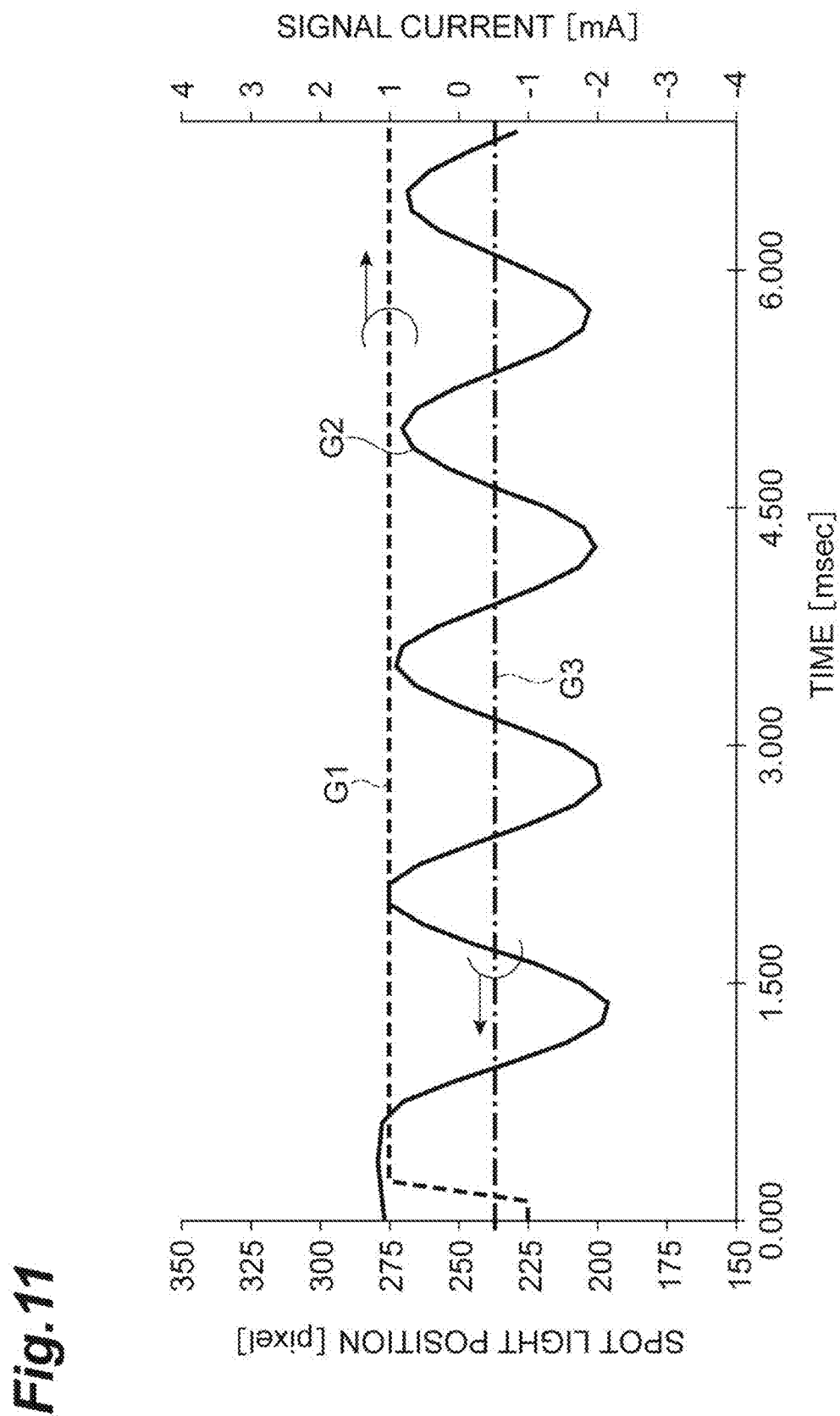
FIG. 11 is a graph showing a waveform of a light deflection angle signal $S_{angle}$ detected by the light deflection angle detection unit 3 in a case in which a suppression control process for an attenuated vibration response is not executed.
Figure 12:
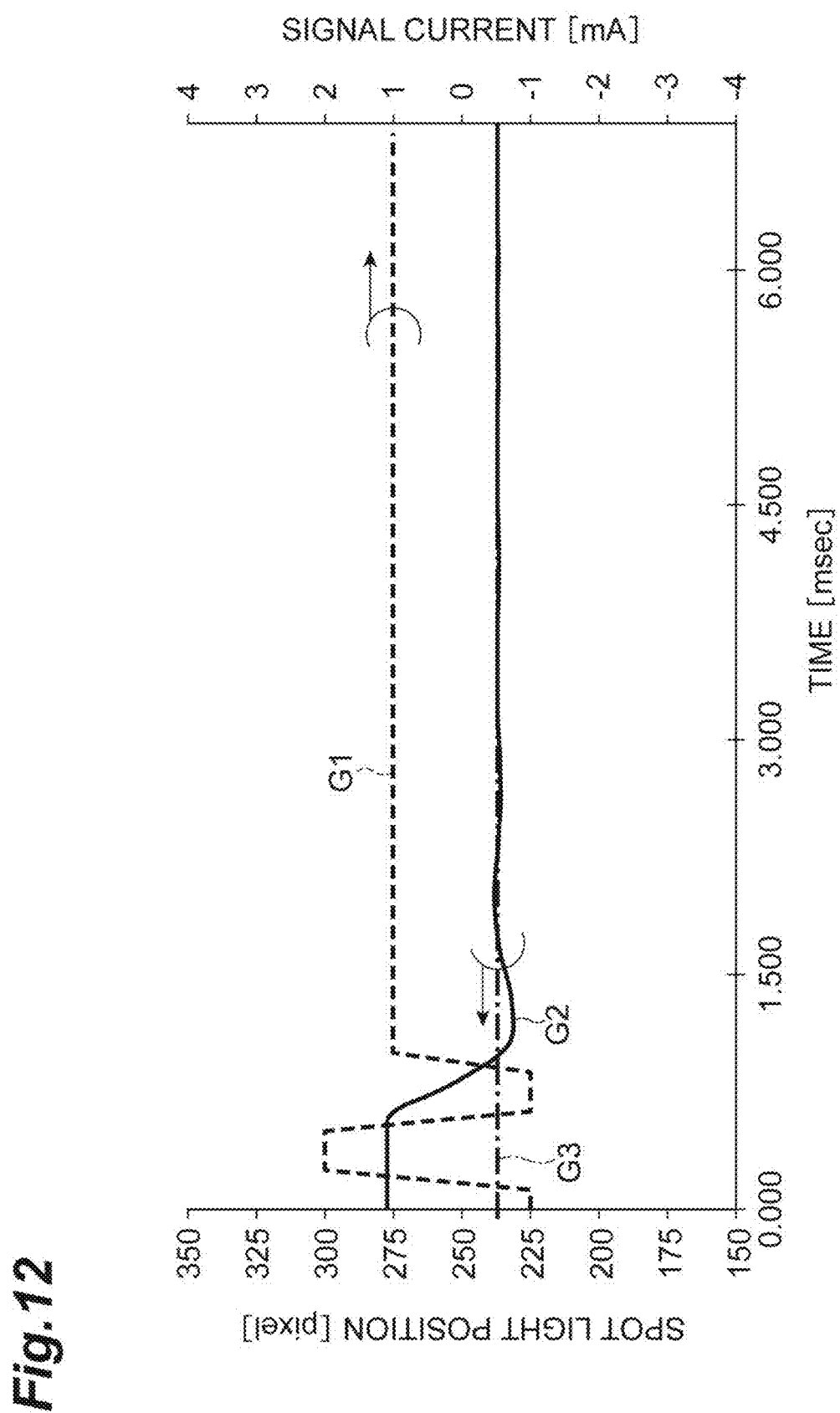
FIG. 12 is a graph showing a waveform of a light deflection angle signal $S_{angle}$ detected by the light deflection angle detection unit 3 in a case in which the suppression control process for an attenuated vibration response is executed.

FIGS. 11 and 12 are graphs showing a waveform of the light deflection angle signal $S_{angle}$ detected by the light deflection angle detection unit 3 when the suppression control process of the attenuated vibration response in the operation control unit 4 is executed and when the suppression control process of attenuated vibration response is not executed. In each graph, a graph G1 shows a temporal change in the light deflection angle control signal $S_{ctrl}$ output from the operation control unit 4, a graph G2 shows a temporal change in the light deflection angle detected by the light deflection angle detection unit 3, and a graph G3 shows a target value of the light deflection angle.

It can be seen that, as illustrated in FIG. 11, when the suppression control process for the attenuated vibration response is not executed, the attenuated vibration response is measured to be around the target value, whereas, as illustrated in FIG. 12, when the suppression control process for the attenuated vibration response is executed, the attenuated vibration is sufficiently suppressed for a time of about 1.5 msec and converges on the target value at a high speed and with high accuracy. Here, as illustrated in FIG. 12, when the suppression control process for the attenuated vibration response is executed, a pre-pulse is set by the operation control unit 4 in an initial period immediately after a switching timing of the target value (a period from about 0.0 msec to about 0.7 msec in FIG. 12). This pre-pulse is set to make a response of light deflection angle control faster.

According to the light beam irradiation device 10 described above, the light beam L emitted from the light source unit 1 is reflected by the light deflection unit 2 and radiated. In this case, the light deflection angle control signal $S_{ctrl}$ is supplied to the driving unit 24 that swings the reflection mirror 21 of the light deflection unit 2, such that the deflection angle of the light deflection unit 2 is controlled to be a predetermined angle and an irradiation angle of the light beam L is set to a desired angle. At the same time, a light reception position of the light beam L on the light reception surface 33a is detected at a frequency equal to or higher than four times the resonance frequency of the light deflection unit 2 by the light deflection angle detection unit 3, and the light deflection angle control signal $S_{ctrl}$ supplied to the driving unit 24 is corrected on the basis of a result of the detection. Accordingly, it is possible to correct the irradiation angle of the light beam L while following the resonance vibration of the reflection mirror 21. As a result, it is possible to sufficiently suppress a variation in the irradiation angle of the light beam L. Furthermore, it is possible to control the irradiation of the light beam to be a desired angle with high accuracy by sufficiently suppressing the variation in the irradiation angle of the light beam.

In light beam control devices of the related art, light deflection units using galvanometer mirrors or the like have been used. High speed or accuracy of mirror angle control in such a light beam control device is determined by performance and accuracy of each component such as angular resolution or rotation speed of a servomotor included in the galvano mirror or position resolution of an encoder. Therefore, in a device in which components having different performance or accuracy are combined, performance or accuracy of the entire device is determined by the component having the lowest performance or accuracy. As a result, a large size and high performance of each component are required for high speed and high accuracy of the device, leading to an increase in size and cost of the entire device.

Meanwhile, in recent years, development of a microelectromechanical system (MEMS) mirror has progressed by applying an MEMS technology. A MEMS mirror is an optical device having both high speed responsiveness and highly accurate angle control characteristics, and features of a small size, low power consumption, and a low cost. As a result of evaluating the characteristics of the MEMS mirror, the inventors of the present invention have newly found that there is an attenuated vibration response caused by spring stiffness of a spring structure included in the MEMS mirror and a shape of the built-in mirror and a response duration is about tens of milliseconds. Based on this, it has been found that when the MEMS mirror is used for the light beam control device, it is necessary to suppress the attenuated vibration response in order to achieve high speed and high accuracy of control of the light deflection angle. According to the light beam irradiation device 10 of the embodiment, since measurement of the light deflection angle of the light beam L and feedback control thereof are performed at a frequency equal to or higher than four times the resonance frequency of the light deflection unit 2 including the MEMS mirror, the attenuated vibration response of the MEMS mirror described above can be suppressed to about several milliseconds.

Further, the operation control unit 4 of the light beam irradiation device 10 can correct the irradiation angle of the light beam L while following the resonance vibration of the reflection mirror 21 by executing the feedback control on the basis of the angle information calculated on the basis of the detection signal in the light deflection angle detection unit 3 to correct the driving signal.

Further, the light deflection angle detection unit 3 is a photodetector including a plurality of pixels in which photodetection elements outputting luminance information as a numerical value for each pixel are arranged one-dimensionally or two-dimensionally. The photodetector is, for example, an area sensor, a linear sensor, or an optical sensor. With such a configuration, a structure in the light deflection angle detection unit 3 can be further simplified.

Next, an operation example of the suppression control process for the attenuated vibration response by the light beam irradiation device 10 according to the embodiment will be described.

Figure 13:
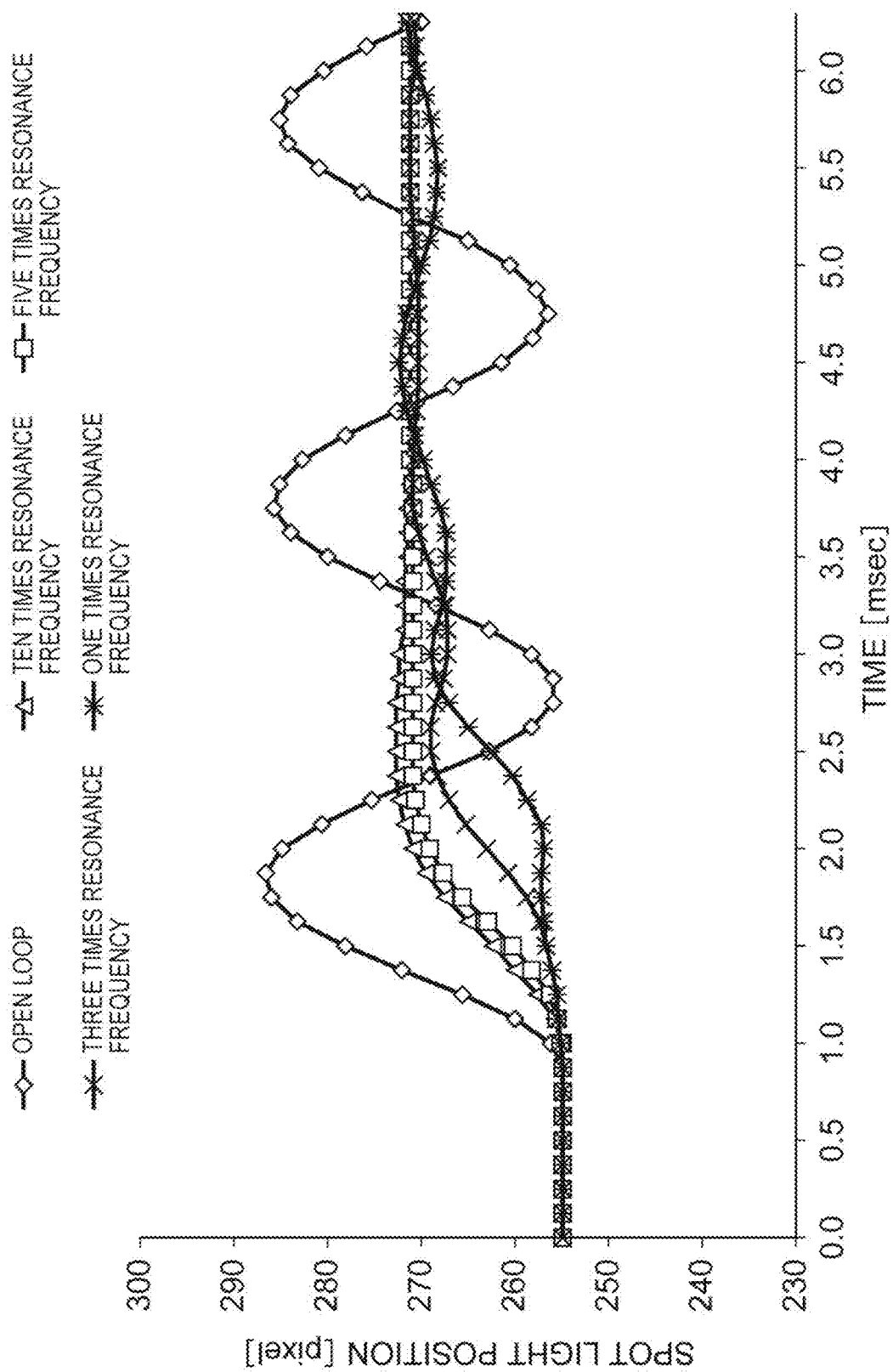
FIG. 13 is a graph showing a waveform of the light deflection angle signal $S_{angle}$ detected by the light deflection angle detection unit 3 in FIG. 1 in a case in which a control frequency of suppression control for an attenuated vibration response in the operation control unit 4 in FIG. 1 is changed.
Figure 14:
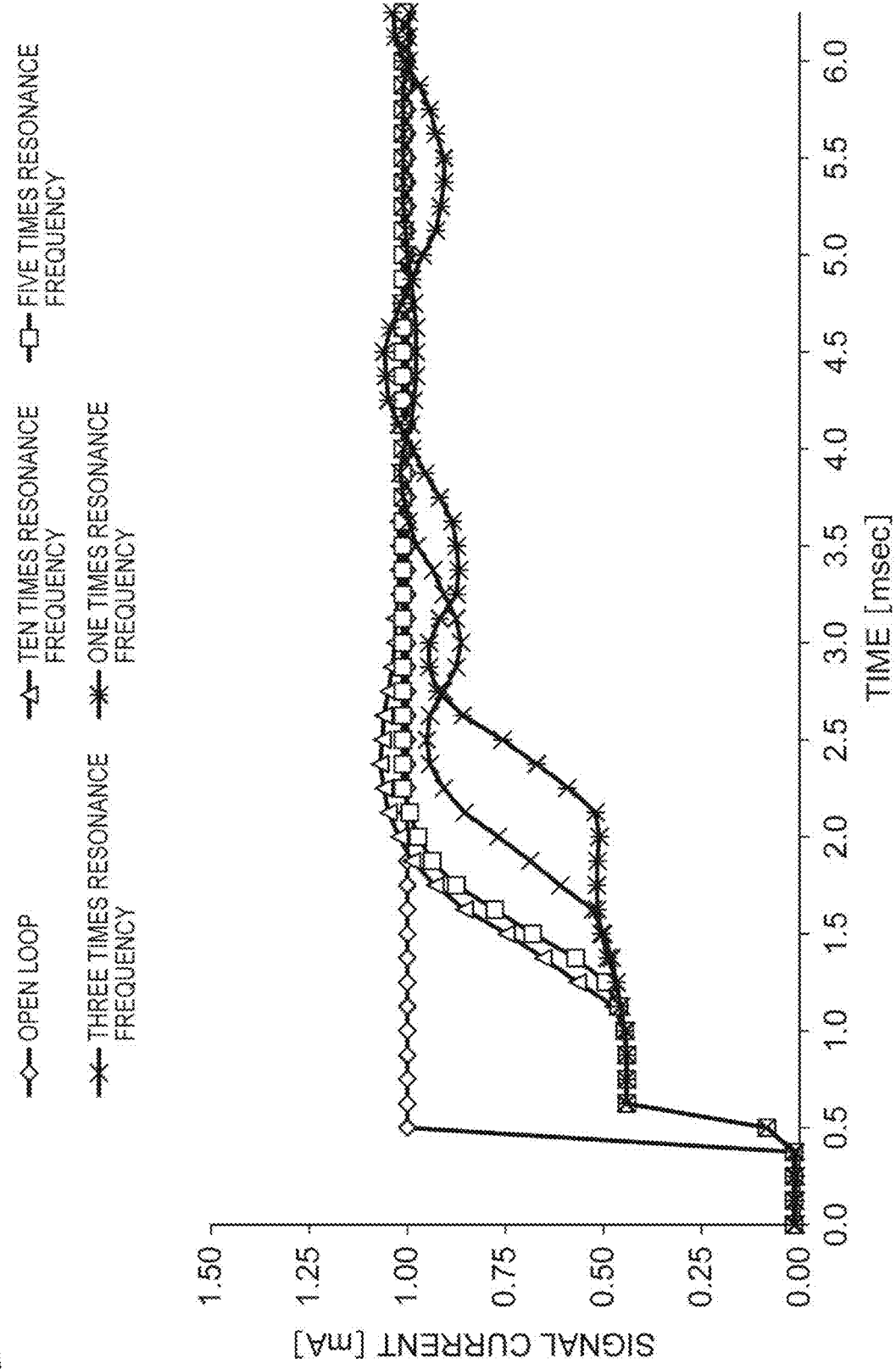
FIG. 14 is a graph showing a waveform of a light deflection angle control signal $S_{ctrl}$ corresponding to the time of an operation in FIG. 13.

FIG. 13 is a graph showing a waveform of the light deflection angle signal $S_{angle}$ detected by the light deflection angle detection unit 3 in a case in which the control frequency of suppression control for an attenuated vibration response in the operation control unit 4 is changed, and FIG. 14 is a graph showing a waveform of the light deflection angle control signal $S_{ctrl}$ corresponding to the time of the operation in FIG. 13. In this case, the light deflection angle control signal $S_{ctrl}$ is set so that a pre-pulse for making the response of the light deflection angle control faster is not added. According to these measurement results, when the suppression control for the attenuated vibration response is not executed (in the case of open loop driving) and when the control frequency is one and three times the resonance frequency of the light deflection unit 2, it has been found that that an influence of attenuated vibration of the light deflection angle remains. On the other hand, when the control frequency is greater than four times at five times or ten times the resonance frequency of the light deflection unit 2, it has been found that the attenuated vibration of the light deflection angle is sufficiently suppressed.

Figure 15:
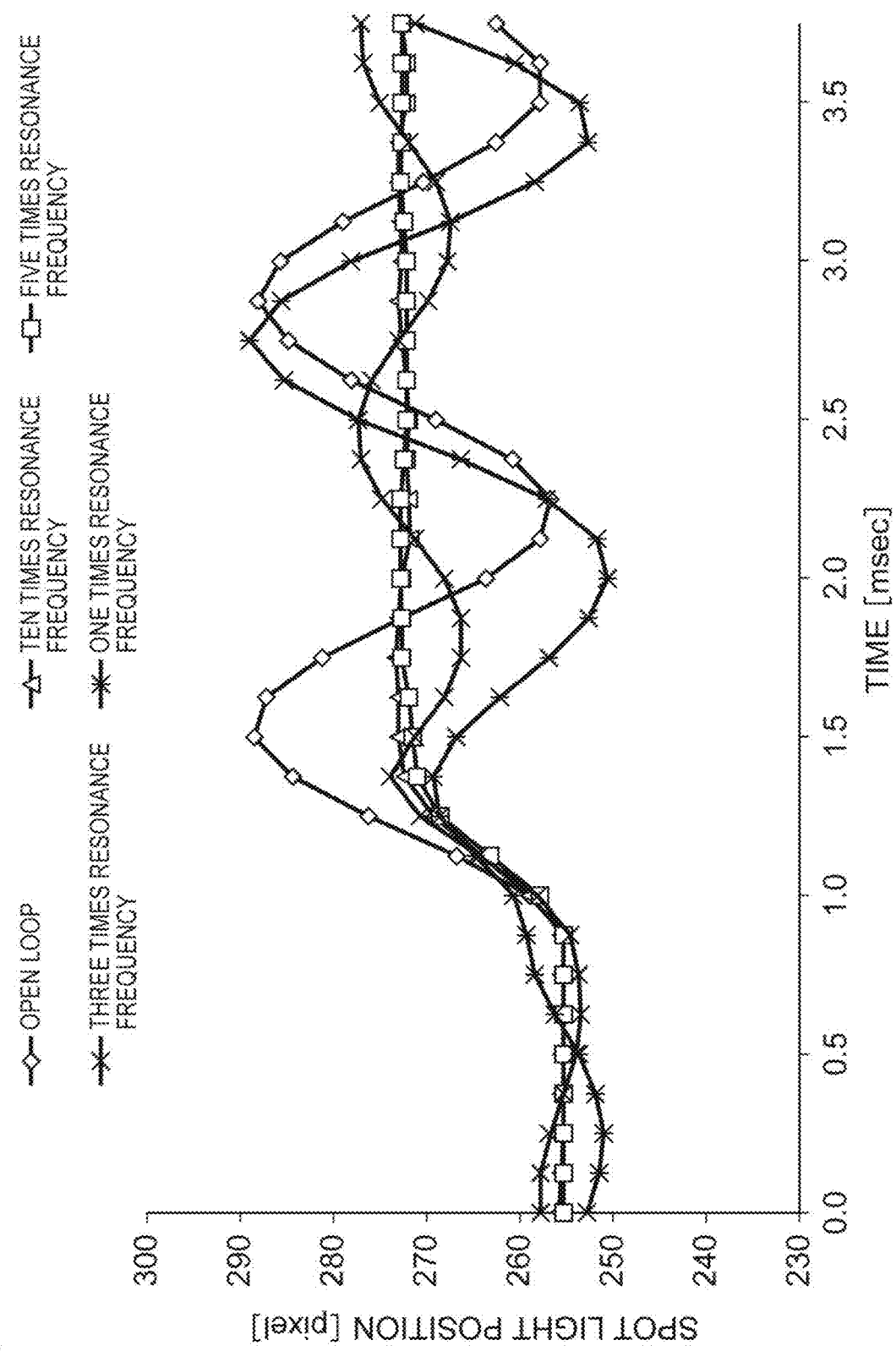
FIG. 15 is a graph showing a waveform of the light deflection angle signal $S_{angle}$ detected by the light deflection angle detection unit 3 in FIG. 1 in a case in which a control frequency of suppression control for an attenuated vibration response in the operation control unit 4 in FIG. 1 is changed.
Figure 16:
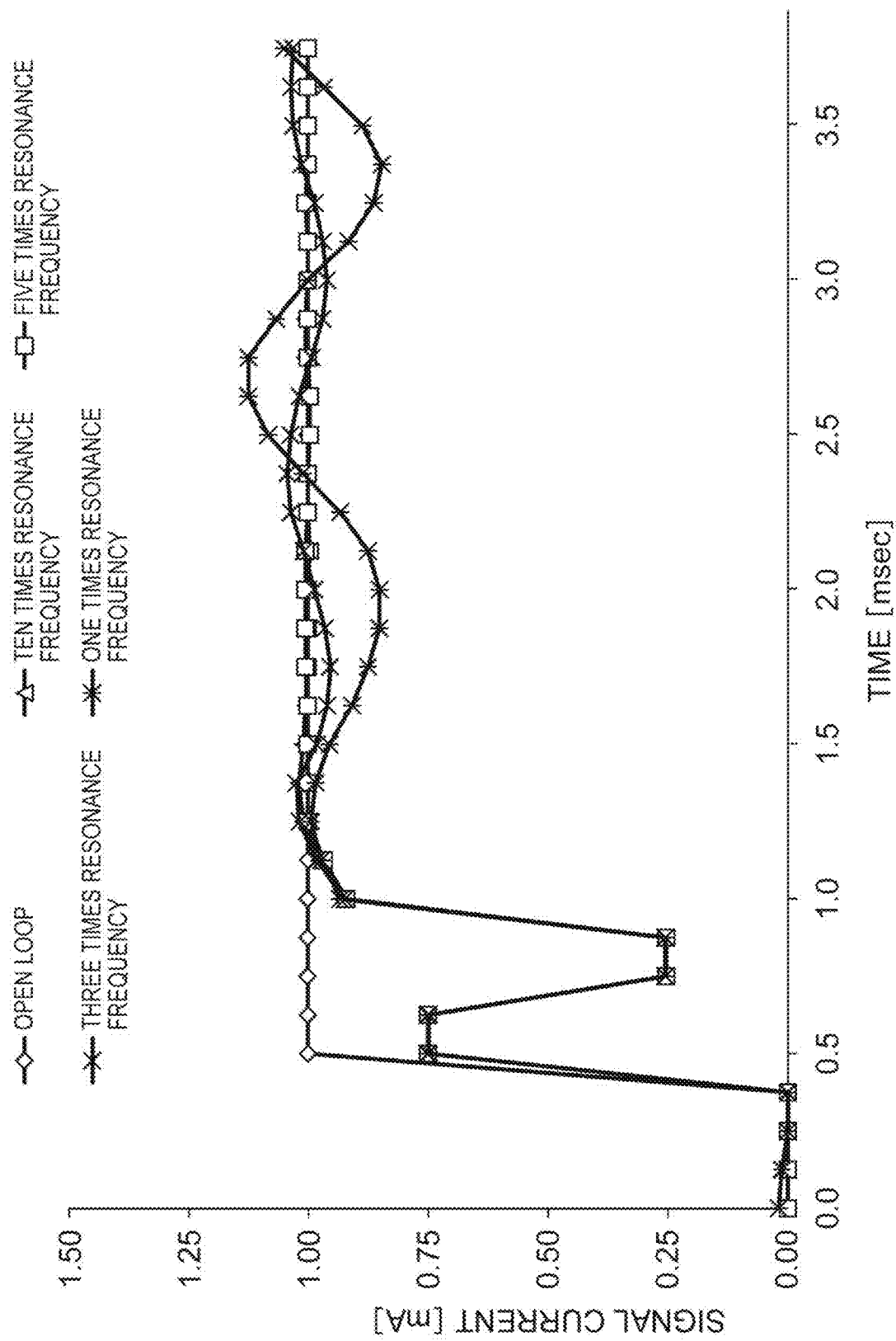
FIG. 16 is a graph showing a waveform of a light deflection angle control signal $S_{ctrl}$ corresponding to the time of an operation in FIG. 15.

Further, FIG. 15 is a graph showing a waveform of the light deflection angle signal $S_{angle}$ detected by the light deflection angle detection unit 3 in a case in which the control frequency of suppression control for an attenuated vibration response in the operation control unit 4 is changed, and FIG. 16 is a graph showing a waveform of the light deflection angle control signal $S_{ctrl}$ corresponding to the time of the operation in FIG. 15. In this case, the light deflection angle control signal $S_{ctrl}$ is set so that a pre-pulse is added in a case other than the case of open loop driving. According to the measurement results, when the control frequency is one time and three times the resonance frequency of the light deflection unit 2, the influence of attenuated vibration of the light deflection angle remains, and when the control frequency is greater than four times at five times or ten times the resonance frequency, it has been found that the attenuated vibration of the light deflection angle is sufficiently suppressed. Further, from the measurement results in FIGS. 13 to 16, it has been found that setting the control frequency equal to or higher than four times the resonance frequency is effective in suppressing the attenuated vibration regardless of whether or not a pre-pulse is added to the light deflection angle control signal $S_{ctrl}$.

Although various embodiments of the present invention have been described above, the present invention is not limited to the above-described embodiments, and the present invention can be modified or otherwise applied without departing from the gist described in each claim.

Figure 17:
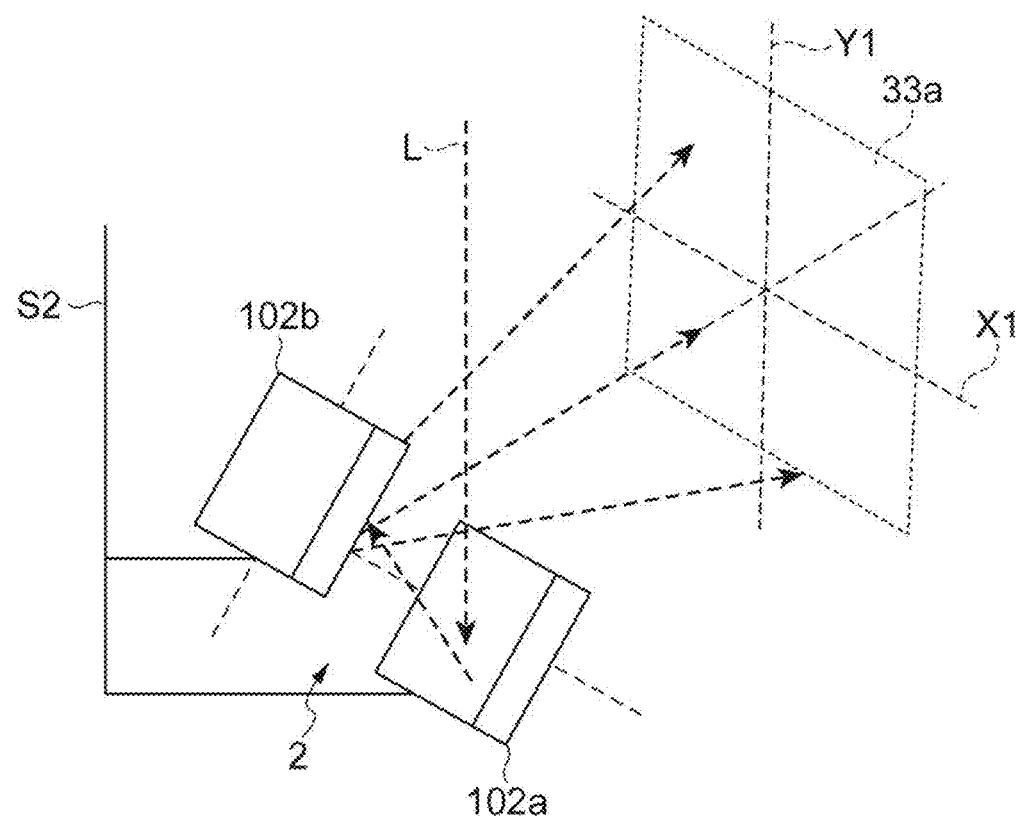
FIG. 17 is a perspective view illustrating a reflected state of the light beam L in the light deflection unit 2 of a modification example.

For example, while a configuration in which the light deflection unit 2 can deflect the light beam L two-dimensionally in a first direction and a second direction intersecting the first direction has been adopted in the light beam irradiation device 10 according to the above embodiment, a plurality of combinations of configurations for one-dimensionally deflecting the light beam L may be adopted. For example, one example of the configuration includes a configuration in which a plurality of one-dimensional. MEMS mirrors each capable of swinging the reflection mirror in one direction are used. FIG. 17 is a perspective view illustrating a reflected state of the light beam L in the light deflection unit 2 in a modification example in which this configuration is adopted. In such a modification example, two one-dimensional MEMS mirrors 102a and 102b are included, one MEMS mirror 102a receives the light beam L and reflects the light beam L toward the other MEMS mirror 102b, and the other MEMS mirror 102b further reflects the light beam L and outputs the reflected light beam L to the light reception surface 33a. In this case, the one MEMS mirror 102a is driven to deflect the light beam L radiated from the light source unit 1 through non-resonance driving in the X1 direction on the light reception surface 33a, and the other MEMS mirror 102b is driven to deflect the light beam L reflected by the MEMS mirror 102a through non-resonance driving in the Y1 direction perpendicular to the X1 direction on the light reception surface 33a. Such MEMS mirrors 102a and 102b are connected to the operation control unit 4 via the signal line S2 for transferring the light deflection angle control signal $S_{ctrl}$. According to the modification example described above, the irradiation angle of the light beam L can be controlled with high accuracy at a high speed.

Figure 18:
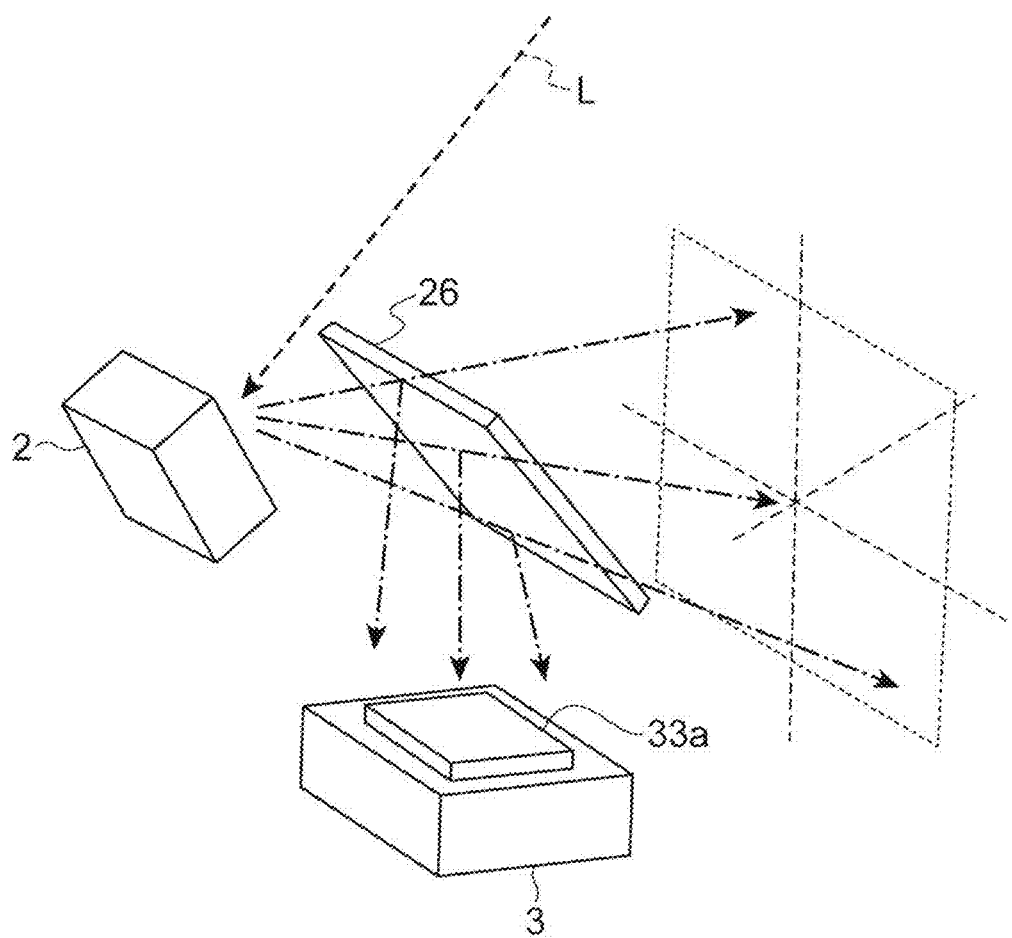
FIG. 18 is a perspective view illustrating a reflected state of the light beam L in the light deflection unit 2 of a modification example.

Further, the light beam irradiation device 10 according to the above embodiment may be configured such that a light branching unit 26 that divides a part of the light beam L reflected by the light deflection unit 2 toward the light deflection angle detection unit 3 may be included, and the light divided by the light division unit is received on the light reception surface 33a of the light deflection angle detection unit 3. For example, the light beam irradiation device 10 is configured such that a light beam corresponding to about 1% to several % of light intensity of the light beam L is branched by the light branching unit 26 and is incident on the light deflection angle detection unit 3. By providing such a light branching unit 26, it is possible to realize control of the irradiation angle without affecting the light intensity in the light beam L. A configuration in which an optical element such as a beam sampler or an optical device having performance satisfying the above object is included is used as the light branching unit 26. FIG. 18 is a perspective view illustrating a reflected state of the light beam L in the light deflection unit 2 according to the modification example. Thus, the light beam L emitted from the light source unit 1 is incident on the light deflection unit 2, and a part of the light beam L reflected by the light deflection unit 2 is branched by the light branching unit 26 and incident on the light reception surface 33a of the light deflection angle detection unit 3.

Figure 19:
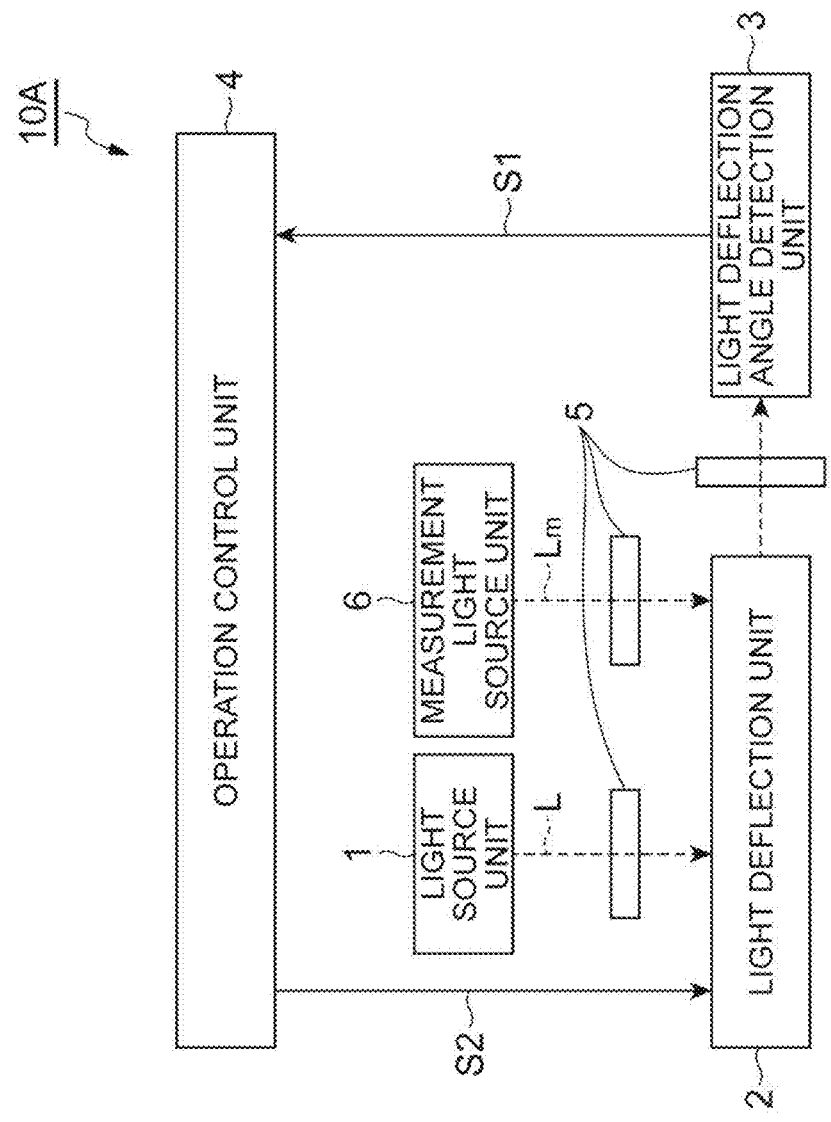
FIG. 19 is a schematic configuration diagram illustrating a light beam irradiation device according to a modification example.

In addition, FIG. 19 illustrates a configuration of a light beam irradiation device 10A according to another modification example of the present invention. Differences from the above-described embodiment of the light beam irradiation device 10A are that a measurement light source unit (a light source for monitoring) 6 different from the light source unit 1 is further included, and the measurement light source unit 6 irradiates the light deflection unit 2 with measurement light beam $L_m$ for measurement (monitoring) of the deflection angle of the light beam L. A configuration of the measurement light source unit 6 is the same as that of the light source unit 1. In the light beam irradiation device 10A, the light reception surface 33a of the light deflection angle detection unit 3 is irradiated from the measurement light source unit 6 and receives the measurement light beam $L_m$ deflected by the light deflection unit 2. Further, one or a plurality of ND filters 5 intended to adjust irradiation intensity of the measurement light beam $L_m$ may be disposed at an arbitrary position on an optical path of the measurement light beam $L_m$ in a space between the measurement light source unit 6 and the light deflection unit 2. Similarly, one or a plurality of ND filters 5 may be disposed at an arbitrary position on the optical path of the light beam L in a space between the light source unit 1 and the light deflection unit 2, or ND filters 5 intended to adjust irradiation intensity of the measurement light beam $L_m$ may be disposed in a space between the light deflection unit 2 and the light deflection angle detection unit 3. According to such a modification example, it is possible to realize the control of the irradiation angle without affecting output intensity of the light beam L.

Figure 20:
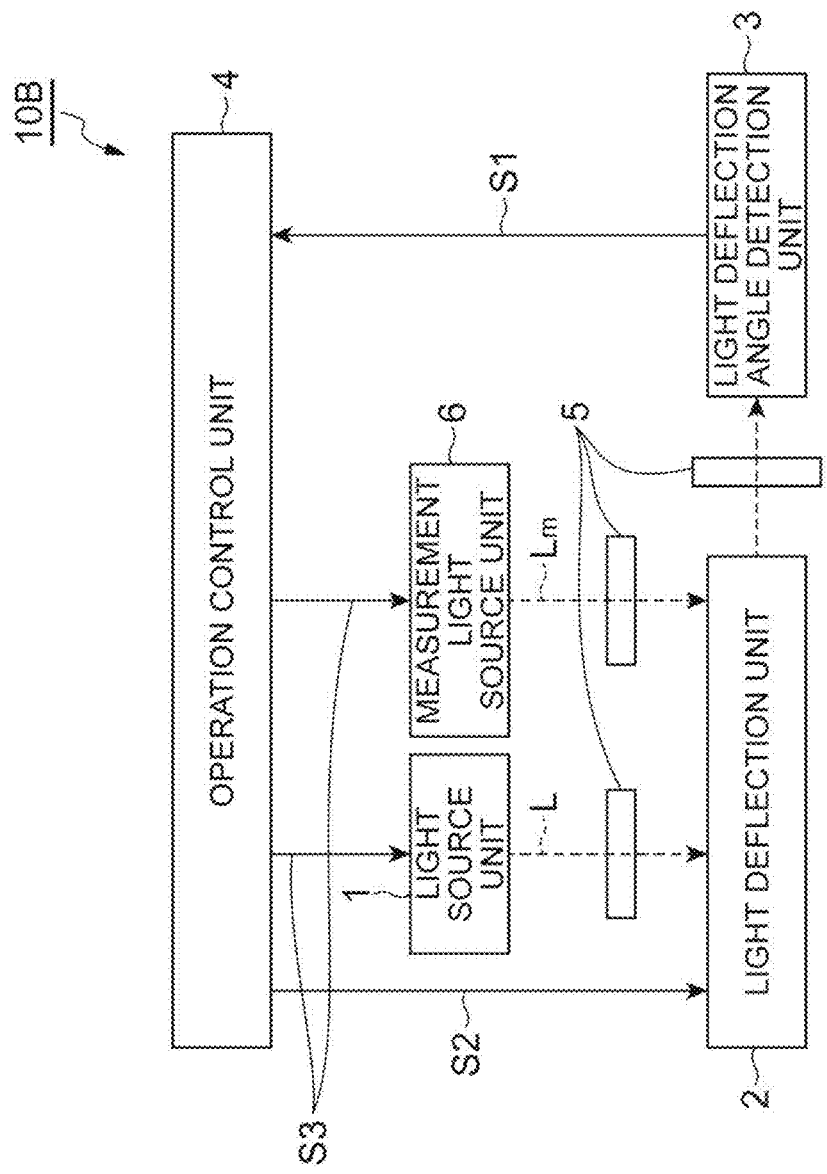
FIG. 20 is a schematic configuration diagram illustrating a light beam irradiation device according to another modification example.

In addition, FIG. 20 illustrates a configuration of a light beam irradiation device 10B according to another modification example of the present invention. Differences between this light beam irradiation device 10B and the light beam irradiation device 10A according to the above modification example include that the operation control unit 4 and the light source unit 1, and the operation control unit 4 and the measurement light source unit 6 are electrically connected to each other by a signal line S3, and a lighting timing of the light source unit 1 and the measurement light source unit 6 can be controlled by the operation control unit 4. Specifically, the operation control unit 4 can output a light source control signal $S_{pulse}$ for controlling the lighting timing to each of the light source unit 1 and the measurement light source unit 6 via the signal line S3. In such a modification example, it is possible to radiate pulsed light from the light source unit 1 and the measurement light source unit 6 at an arbitrary timing, and it is possible to radiate a pulse of the light beam according to a detection speed of the light deflection angle in the light deflection angle detection unit 3 and a cycle of the light deflection angle control in the operation control unit 4.

Figure 21:
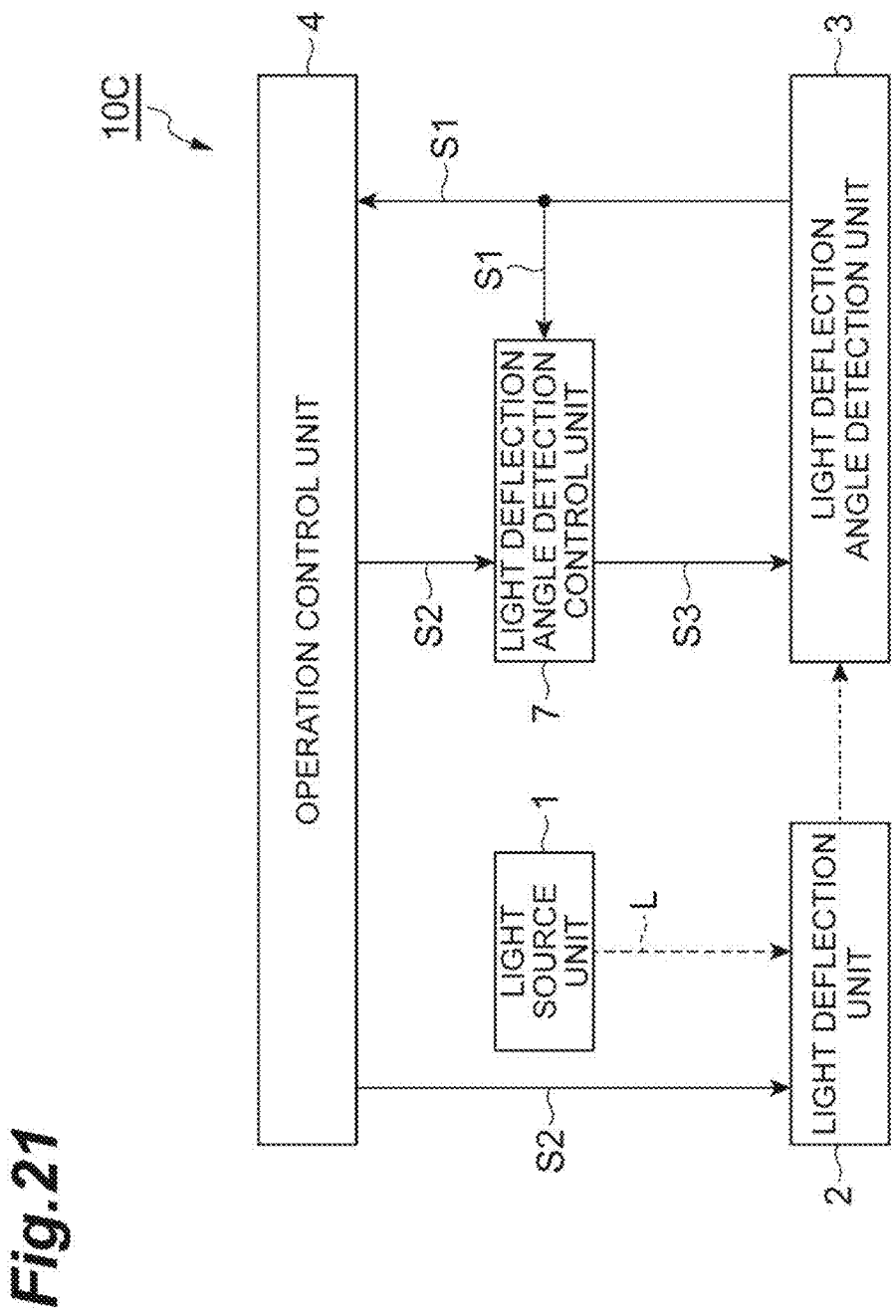
FIG. 21 is a schematic configuration diagram illustrating a light beam irradiation device according to still another modification example.

In addition, FIG. 21 illustrates a configuration of a light beam irradiation device 10C according to another modification example of the present invention. Differences between the light beam irradiation device 10C and the light beam irradiation device of the above-described embodiment include that a light deflection angle detection control unit 7 is further included, and a pixel readout method for a sensor included in the light deflection angle detection unit 3 can be controlled under the control of the light deflection angle detection control unit 7. Normally, a frame rate decreases as the number of pixels of the sensor increases. However, according to such a modification example, it is possible to improve the frame rate of the sensor by appropriately controlling the pixel readout method for the sensor, and therefore it is possible to further improve a light deflection angle detection speed in the light deflection angle detection unit 3.

As illustrated in FIG. 21, the light deflection angle detection control unit 7 of the light beam irradiation device 10C is electrically connected to the operation control unit 4 by the signal line S2 and is electrically connected to the light deflection angle detection unit 3 by the signal lines S1 and S3. With such a configuration, the light deflection angle detection control unit 7 receives the light deflection angle signal $S_{angle}$ from the light deflection angle detection unit 3 and the light deflection angle control signal $S_{ctrl}$ from the operation control unit 4. On the basis of the light deflection angle signal $S_{angle}$, the light deflection angle control signal $S_{ctrl}$, and the detection control signal input by a user of the light beam irradiation device 10C, the light deflection angle detection control unit 7 generates a light deflection angle detection control signal $S_{dtct\_ctrl}$ for controlling a pixel readout method in the light deflection angle detection unit 3, and outputs the light deflection angle detection control signal $S_{dtct\_ctrl}$ to the light deflection angle detection unit 3. Examples of the pixel readout method controlled by the light deflection angle detection control unit 7 include a "partial readout" method, a "binning readout" method, and a "skipping readout" method. The pixel readout methods may be controlled independently or a plurality of methods may be controlled in combination.

In each cycle of control of the pixel readout method, the light deflection angle detection control unit 7 first determines operation control parameters on the basis of an immediately previous light deflection angle control signal $S_{ctrl}$ and an operation condition input by the user. This operation condition is, for example, information for setting a readout condition such as information on a control speed. Specifically, on the basis of the light deflection angle control signal $S_{ctrl}$ and the operation condition, the light deflection angle detection control unit 7 determines operation control parameters including information indicating the control speed of pixel readout and information indicating a range of pixels that are readout targets. In this case, the operation control parameters are determined by using both the light deflection angle control signal $S_{ctrl}$ and the operation condition, but they may be determined using only one of both.

Hereinafter, the control of the pixel readout method in a case in which a sensor including a two-dimensional CMOS sensor is adopted as the light deflection angle detection module 32 of the light deflection angle detection unit 3 will be described in detail below.

Figure 22:
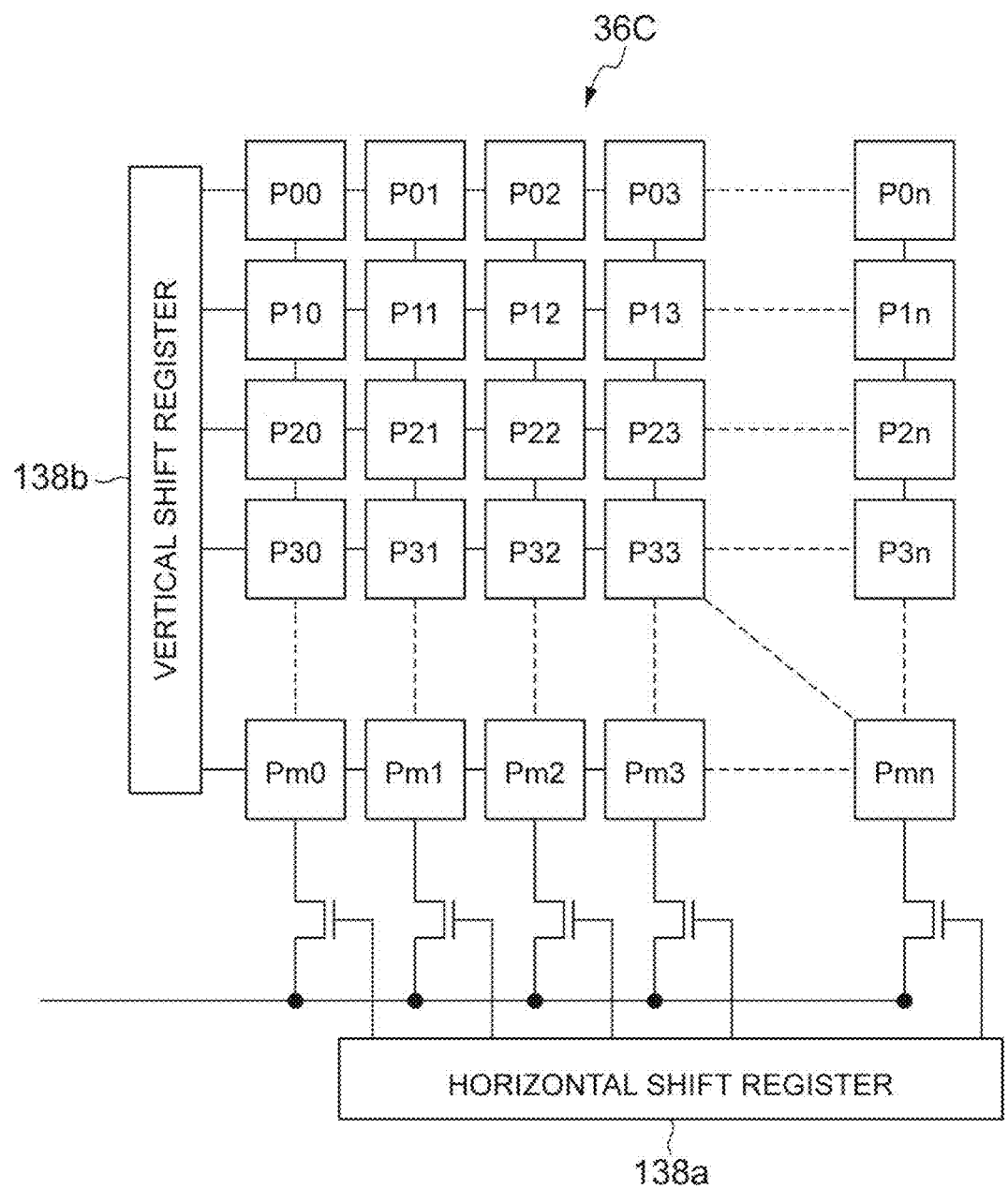
FIG. 22 is a schematic configuration diagram illustrating a structure of a two-dimensional CMOS sensor according to a modification example.

FIG. 22 is a schematic configuration diagram illustrating a structure of the two-dimensional CMOS sensor according to the modification example. Thus, the two-dimensional CMOS sensor 36C includes pixel units P00, P01, P02, . . . , Pmn two-dimensionally arranged in m rows and n columns (m, n: integers equal to or greater than 0), and the total number of pixel units is m×n that is equal to the number of pixels. Each pixel unit includes a photodiode, an amplifier, a transistor, and the like. In FIG. 22, the amplifier, a CDS circuit, and the like in each pixel unit are not illustrated for simplicity of description. The two-dimensional CMOS sensor 36C amplifies charge photoelectrically converted by the photodiode in each pixel unit using the amplifier, and designates an address using a vertical shift register 138b and a horizontal shift register 138a such that a signal corresponding to the amount of charge can be selected and read from any pixel. In a method of performing pixel readout from all the pixels of the two-dimensional CMOS sensor 36C having the above configuration, there is concern that a frame rate of the sensor is slower than the frequency equal to or higher than four times the resonance frequency of the light deflection unit 2, the control does not catch up to it, and controllability may deteriorate. In the modification example, it is possible to improve the frame rate of the sensor and control the light deflection angle at a higher speed by controlling the pixel readout method using the light deflection angle detection control unit 7.

Figure 23:
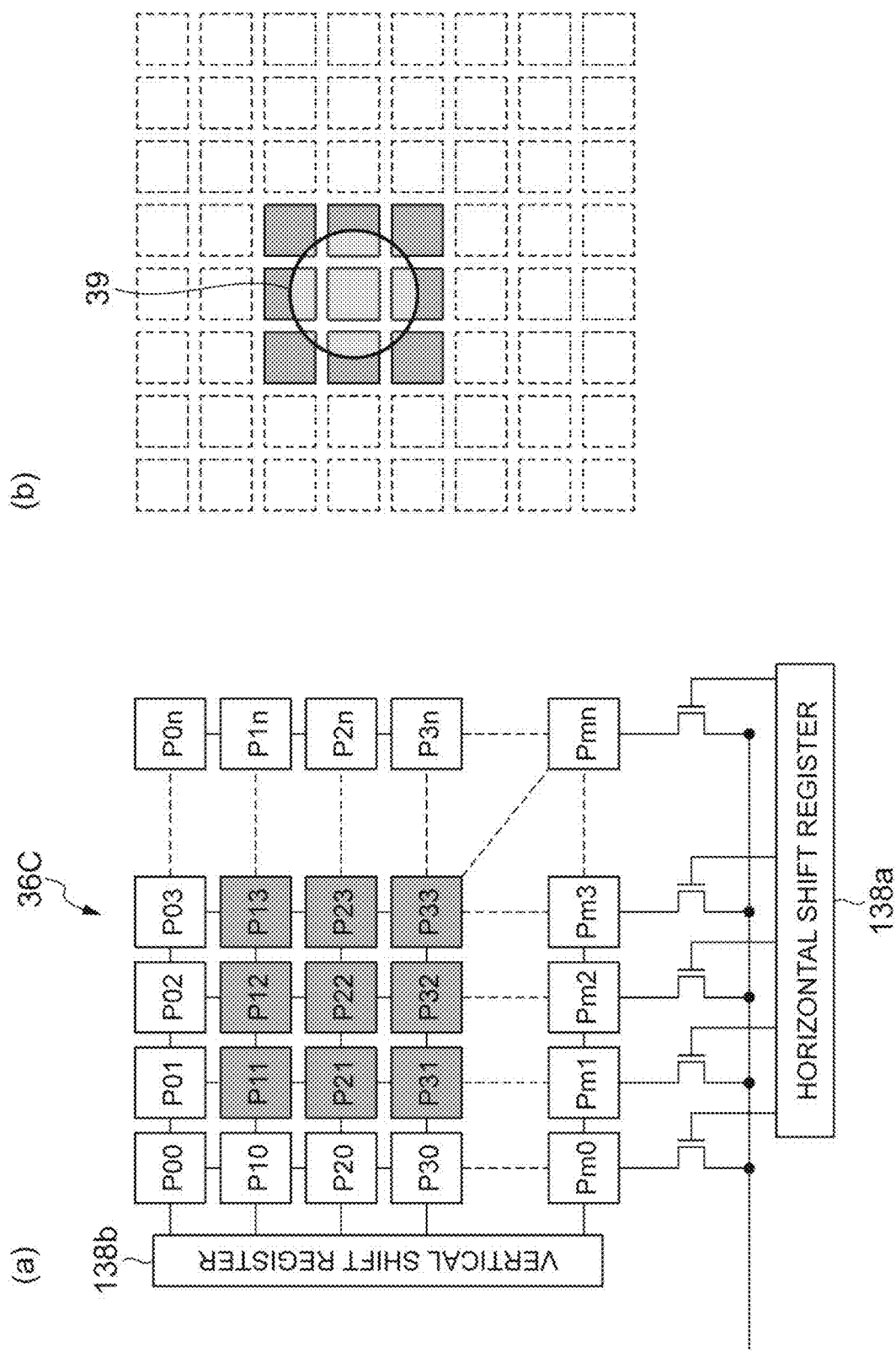
FIG. 23 is a schematic diagram illustrating a principle of partial readout controlled by a light deflection angle detection control unit 7 in FIG. 21.

FIG. 23 is a schematic diagram illustrating a principle of partial readout controlled by the light deflection angle detection control unit 7, in which a part (a) of FIG. 23 illustrates a pixel unit that is a readout target on the two-dimensional CMOS sensor 36C, and a pert (b) of FIG. 23 illustrates a positional relationship between the pixel unit that is a readout target and the spot light 39 of the light beam L.

In the example illustrated in the part (a) of FIG. 23, as a partial readout area, m=1, 2, 3 and n=1, 2, 3 are set in order to specify the pixel that is a readout target using the light deflection angle detection control signal $S_{dtct\_ctrl}$. By performing addressing using the horizontal shift register 138a and the vertical shift register 138b using such a light deflection angle detection control signal $S_{dtct\_ctrl}$, areas of the pixel units P11 to P13, P21 to P23, and P31 to P33 are selectively read. In the partial readout method, since the number of pixels to be read out is smaller than in a case in which all of m×n pixels are read out, it is possible to read out the pixels at a higher speed.

Further, as illustrated in the part (b) of FIG. 23, the pixel unit that is a readout target of the two-dimensional CMOS sensor 36C is controlled according to a position and a size of the spot light 39. The part (b) of FIG. 23 shows that a shaded pixel unit is a readout target. Here, the size of the spot light 39 on the light reception surface on the two-dimensional CMOS sensor 36C is preset by the light source unit 1 that generates the spot light 39 and an optical system provided between the light source unit 1 and the two-dimensional CMOS sensor 36C. That is, the size of the spot light 39 is set to a size equal to or larger than one pixel of the partial readout area so that a two-dimensional position of the spot light 39 can be calculated with subpixel accuracy through one-dimensional centroid computation. The size of the spot light 39 is set to a size that can be detected without deviating from the partial readout area even when the position of the spot light 39 varies due to vibration or the like. For example, according to the example of the part (b) of FIG. 23, the size of the spot light 39 is set to a size corresponding to one or more pixels in the partial readout area of 3×3 pixels and a size not departing from the partial readout area of 3×3 pixels.

The light deflection angle detection control unit 7 acquires information on the position and the size on the light reception surface of the spot light 39 incident on the light reception surface on the two-dimensional CMOS sensor 36C on the basis of the light deflection angle signal $S_{angle}$. The light deflection angle detection control unit 7 generates the light deflection angle detection control signal $S_{dtct\_ctrl}$ to move and change the partial readout area according to the acquired position and the acquired size. In this case, the light deflection angle detection control unit 7 sets a readout start address and a readout end address in the row direction and the column direction in a readout range according to the operation control parameters. It should be noted that the size of the partial readout area is set so that the frame rate of the two-dimensional CMOS sensor 36C is equal to or higher than four times the resonance frequency of the light deflection unit 2. Accordingly, even when the position of the spot light 39 varies to the outside of the partial readout area due to vibration or the like, it is possible to accurately calculate a centroid position by newly setting the partial readout area while following the position variation. In addition, by selectively reading out only an area in which there is the spot light 39, it is possible to perform readout at a higher speed as compared with a case in which all the pixels are read out and to control the light deflection angle with higher accuracy.

FIG. 24 is a schematic diagram illustrating a principle of binning readout controlled by the light deflection angle detection control unit 7, in which a part (a) of FIG. 24 illustrates a pixel unit that is a readout target on the two-dimensional CMOS sensor 36C, and a part (b) of FIG. 24 illustrates a positional relationship between the pixel unit that is a readout target and the spot light 39 of the light beam L.

In the example illustrated in the part (a) of FIG. 24, the vertical shift register 138b and the horizontal shift register 138a are controlled by the light deflection angle detection control signal $S_{dtct\_ctrl}$ so that the four pixel units including pixel units P00, P01, P10, and P11 are integrated into one pixel and read. In this case, luminance of the one pixel obtained by integrating the four pixel units to be read may be read out as a total value of the four pixel units or may be read out as an average value of the four pixel units. Particularly, in a case in which the luminance is read out as a total value of four pixel units, the luminance is increased as compared with the luminance of one pixel unit, and therefore sensitivity per pixel can be relatively improved. Similarly, the light deflection angle detection control unit 7 performs control so that four adjacent pixel units such as pixel units P02, P03, P12, and P13, pixel units P20, P21, P30, and P31, and pixel units P22, P23, P32, and P33 are read out as one pixel. In the binning readout method, the absolute number of pixels to be read out is smaller than in a case in which all of m×n pixels are read out, and therefore resolution is lowered but it is possible to perform readout at a higher speed.

In the example illustrated in the part (b) of FIG. 24, the two-dimensional CMOS sensor 36C is controlled so that binning readout is performed for each of four adjacent pixel units. The part (b) of FIG. 24 shows that readout is performed for each pixel unit shaded with a different pattern, and also shows a position and a size of the spot light 39 with respect to the pixel unit of which the readout is controlled in this way. Here, the size of the spot light 39 on the light reception surface on the two-dimensional CMOS sensor 36C is preset by the light source unit 1 that generates the spot light 39 and an optical system provided between the light source unit 1 and the two-dimensional CMOS sensor 36C. That is, the size of the spot light 39 is set to a size equal to or larger than an area to be processed as an area corresponding to one pixel by the binning readout so that a two-dimensional position of the spot light 39 can be calculated with subpixel accuracy through one-dimensional centroid computation. For example, according to the example of the part (b) of FIG. 24, the size of the spot light 39 is set to be equal to or larger than the size of the 2×2 pixel units since each area of the 2×2 pixel unit is set as an area corresponding to one pixel in the binning readout.

The light deflection angle detection control unit 7 sets information for designating a binning readout range and a readout start address and a readout end address in the binning readout range in the light deflection angle detection control signal By designating the range and setting the readout start address and the readout end address, "a number of pixels to be read out as one pixel" is designated. In the case of the two-dimensional CMOS sensor 36C, this binning readout range is designated in units of pixels by the vertical shift register 138b and the horizontal shift register 138a. As described above, the light deflection angle detection control unit 7 controls the driving condition so that the frame rate in the light deflection angle detection is equal to or higher than four times the resonance frequency in the light deflection unit 2. Further, the light deflection angle detection control unit 7 can acquire information on the position and the size on the light reception surface of the spot light 39 incident on the light reception surface on the two-dimensional CMOS sensor 36C on the basis of the light deflection angle signal $S_{angle}$. The light deflection angle detection control unit 7 may generate the light deflection angle detection control signal $S_{dtct\_ctrl}$ so that the binning readout range is changed according to the acquired position and the acquired size of the spot light 39. Accordingly, even when the position of the spot light 39 varies to a position outside the binning readout range due to vibration or the like, it is possible to accurately calculate a centroid position by newly setting the binning readout area while following the variation in the position. As described above, faster readout can be performed as compared with the case in which all the pixels are read out by performing the binning readout in which a plurality of pixels are read out at a time, thereby enabling more accurate light deflection angle control.

Figure 25:
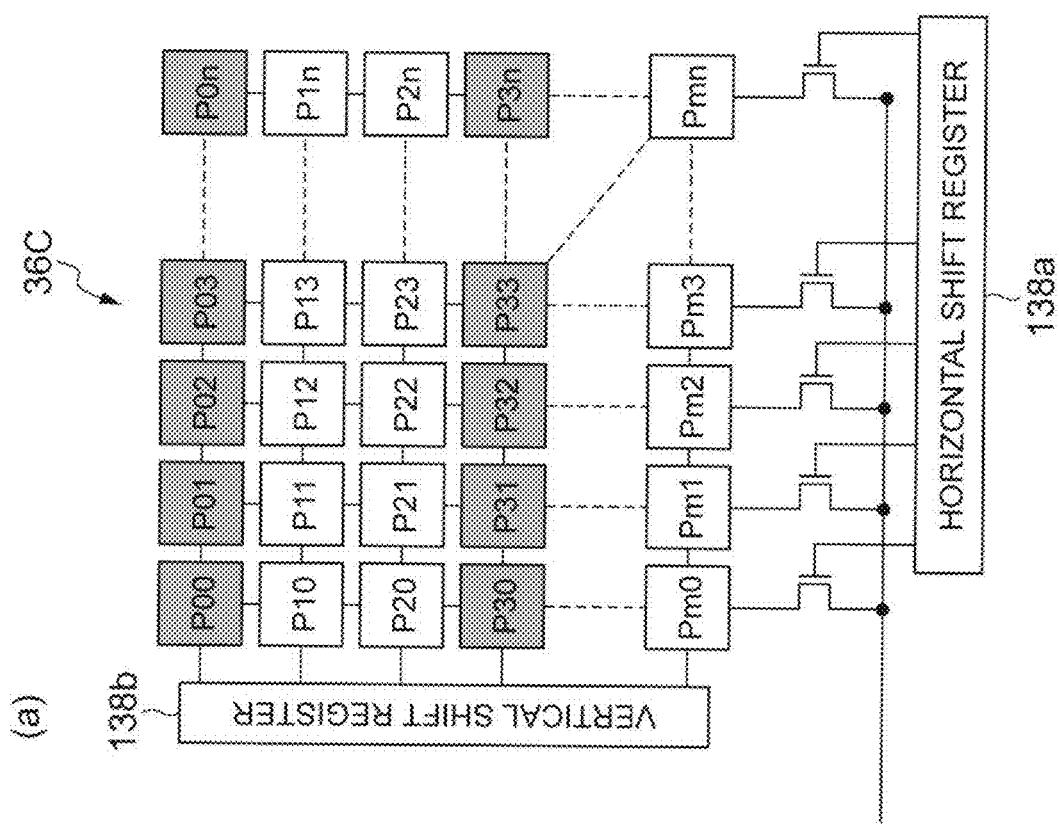
FIG. 25 is a schematic diagram illustrating a principle of skipping readout controlled by the light deflection angle detection control unit 7 in FIG. 21.

FIG. 25 is a schematic diagram illustrating a principle of skipping readout controlled by the light deflection angle detection control unit 7, in which a part (a) of FIG. 25 illustrates a pixel unit that is a readout target on the two-dimensional CMOS sensor 36C, and a part (b) of FIG. 25 illustrates a positional relationship between the pixel unit that is a readout target and the spot light 39 of the light beam L.

In the example illustrated in the part (a) of FIG. 25, using the light deflection angle detection control signal $S_{dtct\_ctrl}$, the vertical shift register 138b and the horizontal shift register 138a are controlled so that, after the pixel units of one row including the pixel units P00, P01, . . . , P0n are read out, pixel units of two rows including the respective first pixel units P10 and P20 are skipped in the readout, and then the pixel units of one row including the pixel units P30, P31, . . . , P3n are read out. Since this skipping readout is a method of decimating unnecessary rows and columns and performing readout, the absolute number of pixels to be read out is reduced as compared with a case in which all of m×n pixels are read out, and therefore it is possible to perform readout at a higher speed.

Further, as illustrated in the part (b) of FIG. 25, setting of the readout skipping area in the skipping readout in the two-dimensional CMOS sensor 36C is controlled according to the position and the size of the spot light 39, such that the frame rate in the two-dimensional CMOS sensor 36C can be increased. The part (b) of FIG. 25 shows that a shaded pixel unit is a pixel unit in the readout area and also shows a position and a size of the spot light 39 with respect to the pixel unit of which the readout is controlled in this way. In addition, as indicated by a dotted line in the part (b) of FIG. 25, two rows sandwiched between pixel units set as readout areas are set as a readout skipping area, and a pixel unit in a row before the pixel unit set as the readout area and a pixel unit in a row after the pixel unit set as the readout area are similarly set as the readout skipping area. Here, the size of the spot light 39 on the light reception surface on the two-dimensional CMOS sensor 36C is preset by the light source unit 1 that generates the spot light 39 and an optical system provided between the light source unit 1 and the two-dimensional CMOS sensor 36C. That is, the size of the spot light 39 is set to be equal to or larger than the number of rows (or the number of columns) in the readout skipping area of the skipping readout so that a two-dimensional position of the spot light 39 can be calculated with subpixel accuracy through one-dimensional centroid computation. For example, according to the example of the part (b) of FIG. 25, the size of the spot light 39 is set to a size equal to or larger than the pixel unit of two rows which is the number of rows skipped in the readout in the row direction.

The light deflection angle detection control unit 7 sets a readout start address and a readout end address indicating information for designating a readout area in skipping readout and information for designating a readout skipping area in the light deflection angle detection control signal $S_{dtct\_ctrl}$ using the light deflection angle signal $S_{angle}$ and the operation control parameter. By setting of the readout start address and the readout end address indicating the readout area designation and readout skipping area designation, a number of pixels to be read and a number of pixels to be skipped in the readout are designated. In this case, in the case of the two-dimensional CMOS sensor 36C, the readout area and the readout skipping area are designated in units of pixels by the vertical shift register 138b and the horizontal shift register 138a. Thus, the light deflection angle detection control unit 7 controls the driving condition so that the frame rate in light deflection angle detection is equal to or higher than four times the resonance frequency of the light deflection unit 2. Further, the light deflection angle detection control unit 7 can acquire information on the position and the size on the light reception surface of the spot light 39 incident on the light reception surface on the two-dimensional CMOS sensor 36 on the basis of the light deflection angle signal $S_{angle}$. The light deflection angle detection control unit 7 may generate the light deflection angle detection control signal $S_{dtct\_ctrl}$ so that the skipping area in skipping readout is changed according to the acquired position and the acquired size of the spot light 39.

Accordingly, even when the position of the spot light 39 varies to the readout skipping area due to vibration or the like, it is possible to accurately calculate a centroid position by newly setting the readout skipping area while following the variation in the position. By performing skipping readout in which unnecessary rows and columns are decimated as described above, it is possible to perform readout at a higher speed as compared with the case in which all the pixels are read out, and to perform more accurate light deflection angle control.

According to the modification example in which the two-dimensional CMOS sensor is adopted, a readout time can be shortened, and the two-dimensional CMOS sensor can be driven at a higher frame rate. Accordingly, light deflection angle control with higher speed and higher accuracy becomes possible.

Next, details of the control of the pixel readout method in a case in which a sensor including a CMOS sensor for acquisition of two-dimensional projection data is adopted as the light deflection angle detection module 32 of the light deflection angle detection unit 3 will be described in the modification example. Here, the CMOS sensor 36 having the configuration illustrated in FIG. 6 is adopted. Even when the CMOS sensor 36 is used, the frame rate of the sensor is improved by controlling the pixel readout method using the light deflection angle detection control unit 7, as in a case in which the two-dimensional CMOS sensor 36C is used. Thus, it is possible to control light deflection angle at a higher speed.

Figure 26:
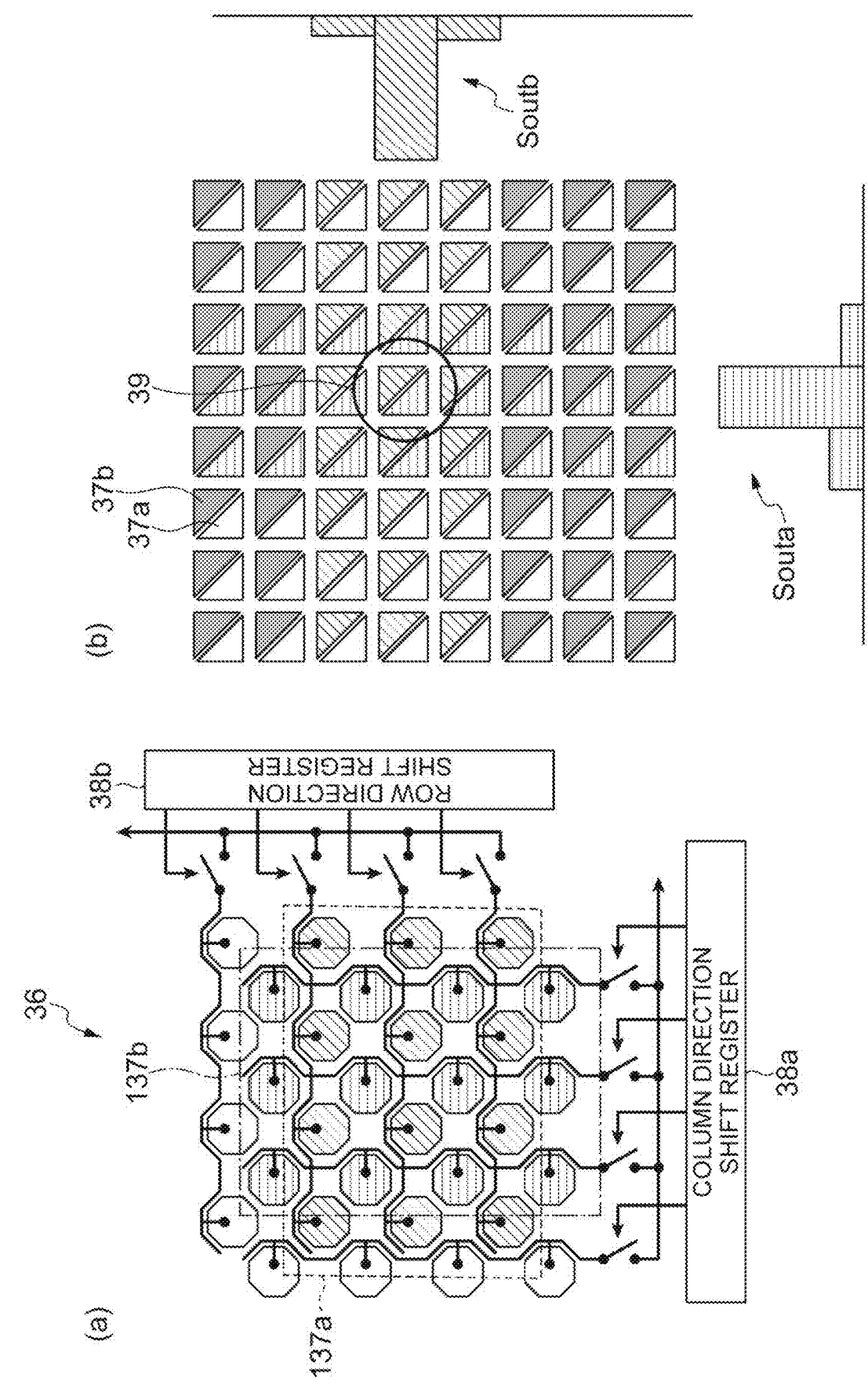
FIG. 26 is a schematic diagram illustrating a principle of partial readout controlled by the light deflection angle detection control unit 7 in FIG. 21.

FIG. 26 is a schematic diagram illustrating a principle of partial readout controlled by the light deflection angle detection control unit 7, in which a part (a) of FIG. 26 illustrates a pixel that is a readout target on the CMOS sensor 36 and a part (b) of FIG. 26 illustrates a positional relationship between a pixel that is a readout target and the spot light 39 of the light beam L.

In the example illustrated in the part (a) of FIG. 26, using the light deflection angle detection control signal $S_{dtct\_ctrl}$, an area 137a corresponding to three rows of pixels is set as a readout area by the row direction shift register 38b, and an area 137b corresponding to three columns of pixels is set as a readout area by the column direction shift register 38a. Using the light deflection angle detection control signal $S_{dtct\_ctrl}$, an area read out by the row direction shift register 38b and the column direction shift register 38a is partially designated and selected. In the partial readout method, since the number of pixels to be read out is smaller than in a case in which all pixels are read out, it is possible to read out the pixels at a higher speed.

Further, as illustrated in the part (b) of FIG. 26, the pixel unit that is a readout target of the CMOS sensor 36 is controlled according to the position and the size of the spot light 39. In the part (b) of FIG. 26 and a subsequent figure illustrating a positional relationship between the pixel that is a readout target and the spot light of the light beam L, one pixel in the CMOS sensor 36 is represented by a combination of one column direction pixel 37a represented by an isosceles triangle and one row direction pixel 37b similarly represented by an isosceles triangle, and only some of the pixels of 256 row direction pixels×256 column direction pixels of the CMOS sensor 36 are shown for the sake of simplicity of description. Further, the part (b) of FIG. 26 also illustrates an output image of the detection signal $S_{outa}$ output from the column direction shift register 38a and the detection signal $S_{outb}$ output from the row direction shift register 38b. Here, the size of the spot light 39 on the light reception surface on the CMOS sensor 36 is preset by the light source unit 1 that generates the spot light 39 and the optical system provided between the light source unit 1 and the CMOS sensor 36. That is, the size of the spot light 39 is set to be equal to or larger than the size of one line in the row direction pixel line and the column direction pixel line set as the partial readout area so that a two-dimensional position of the spot light 39 can be calculated with subpixel accuracy through one-dimensional centroid computation.

The size of the spot light 39 is set to a size that can be detected without deviating from the partial readout area even when the position of the spot light 39 varies due to vibration or the like. For example, according to the example of the part (b) of FIG. 26, an area of pixel lines of three rows in the row direction and an area of pixel lines of three columns in the column direction are set as partial readout areas. In this case, the size of the spot light 39 is set to be equal to or larger than the size of one pixel of the pixel line in the partial readout area in the row direction and the column direction, and to be a size that does not deviate from the readout area in the row direction and the column direction is set.

The light deflection angle detection control unit 7 acquires information on the position and the size on the light reception surface of the spot light 39 incident on the light reception surface on the CMOS sensor 36 on the basis of the light deflection angle signal $S_{angle}$. The light deflection angle detection control unit 7 generates the light deflection angle detection control signal $S_{dtct\_ctrl}$ to move and change the partial readout area according to the acquired position and the acquired size. That is, the light deflection angle detection control unit 7 designates the partial readout position from the light deflection angle signal $S_{angle}$ and the operation control parameter. Further, the light deflection angle detection control unit 7 sets the readout start address and the readout end address in the row direction and the column direction in the readout range in the light deflection angle detection control signal $S_{dtct\_ctrl}$ according to the operation control parameter. In this case, the range specified in the partial readout is designated in units of pixel lines in the row direction and the column direction. It should be noted that the size of the partial readout area (the number of pixel lines) is set so that the frame rate of the CMOS sensor 36 is equal to or higher than four times the resonance frequency of the light deflection unit 2. Accordingly, even when the position of the spot light 39 varies to the outside of the partial readout area due to vibration or the like, it is possible to accurately calculate a centroid position by newly setting the partial readout area while following the position variation. In addition, by selectively reading out only an area in which there is the spot light 39, it is possible to perform readout at a higher speed as compared with a case in which all the pixels are read out and to control the light deflection angle with higher accuracy.

Figure 27:
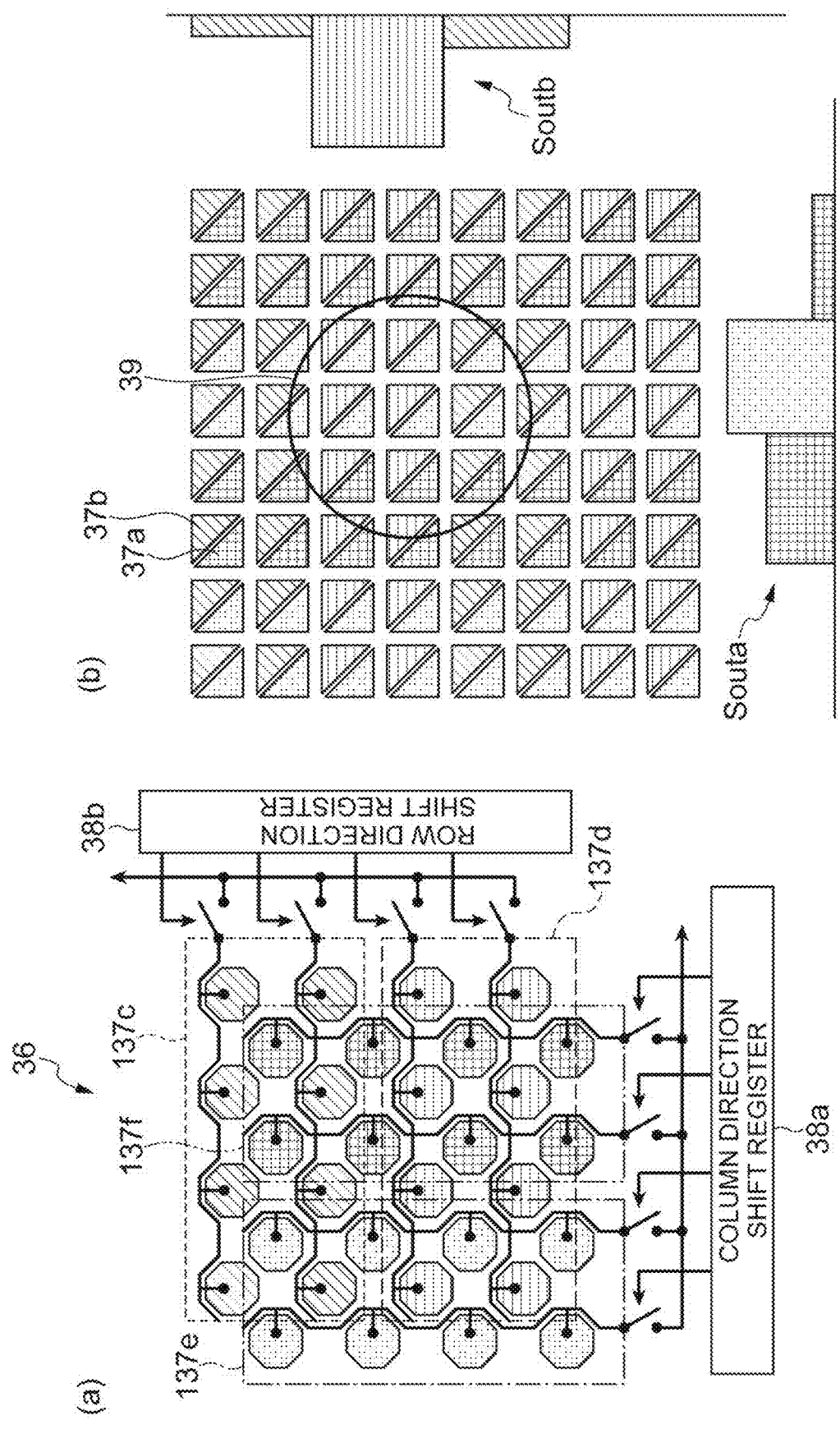
FIG. 27 is a schematic diagram illustrating a principle of binning readout controlled by the light deflection angle detection control unit 7 in FIG. 21.

FIG. 27 is a schematic diagram illustrating a principle of binning readout controlled by the light deflection angle detection control unit 7, in which a part (a) of FIG. 27 illustrates a pixel that is a readout target on the CMOS sensor 36 and a part (b) of FIG. 27 illustrates a positional relationship between the pixel that is the readout target and the spot light 39 of the light beam L.

In the example illustrated in the part (a) of FIG. 27, using the light deflection angle detection control signal $S_{dtct\_ctrl}$, the area 137c and the area 137d corresponding to two rows of the pixel line are integrated and set as a readout area to be read out by the row direction pixel shift register 38b as a pixel line corresponding to one row. Similarly, the area 137e and the area 137f corresponding to two columns of the pixel line are integrated and set as a readout area to be read out by the column direction pixel shift register 38a as a pixel line corresponding to one column. In this case, luminance values of the readout area read out as pixel lines corresponding to one row and one column may be a total value of the pixel lines of a plurality of rows and a plurality of columns or may be an average value of pixel lines of a plurality of rows and a plurality of columns. In particular, when a total value of the pixel lines is set to the luminance value, the luminance value increases as compared with that before binning readout, and therefore the sensitivity can be relatively improved. Pixel lines of a plurality of rows and a plurality of columns can be read out as pixel lines corresponding to one row and one column through binning readout. Therefore, although the resolution is lowered as compared with the case in which all the pixel lines are read out since the number of pixel lines to be read out is reduced, it is possible to perform readout at a higher speed.

Further, as illustrated in the part (b) of FIG. 27, the pixel unit that is a readout target of the CMOS sensor 36 is controlled according to the position and the size of the spot light 39. The size of the spot light 39 on the light reception surface on the CMOS sensor 36 is preset by the light source unit 1 that generates the spot light 39 and the optical system provided between the light source unit 1 and the CMOS sensor 36. That is, the size of the spot light 39 is set to be equal to or larger than the size of in the row direction pixel line and the column direction pixel line set as a size corresponding to one pixel line in the binning readout so that a two-dimensional position of the spot light 39 can be calculated with subpixel accuracy through one-dimensional centroid computation. For example, according to the example of the part (b) of FIG. 27, an area of pixel lines of two rows in the row direction and an area of pixel lines of two columns in the column direction are set as pixel line areas that are binning readout targets. In this case, the size of the spot light 39 is set to a size equal to or larger than the area (two rows and two columns) in which binning readout is performed as a size corresponding to one pixel line in the row direction and the column direction.

The light deflection angle detection control unit 7 sets information for designating a binning readout range and a readout start address and a readout end address in the row direction and the column direction described above in the light deflection angle detection control signal $S_{dtct\_ctrl}$. By designating the range and setting the readout start address and the readout end address, "a number of pixel lines to be read out as one pixel line" is designated. In the case of the two-dimensional CMOS sensor 36, this binning readout range is designated in units of pixel lines by the row direction shift register 38b and the column direction shift register 38a. As described above, the light deflection angle detection control unit 7 controls the driving condition so that the frame rate in the light deflection angle detection is equal to or higher than four times the resonance frequency in the light deflection unit 2. Further, the light deflection angle detection control unit 7 can acquire information on the position and the size on the light reception surface of the spot light 39 incident on the light reception surface on the CMOS sensor 36 on the basis of the light deflection angle signal $S_{angle}$. The light deflection angle detection control unit 7 may generate the light deflection angle detection control signal $S_{dtct\_ctrl}$ so that the binning readout range is changed according to the acquired position and the acquired size of the spot light 39. Accordingly, even when the position of the spot light 39 varies to a position outside the binning readout range due to vibration or the like, it is possible to accurately calculate a centroid position by newly setting the binning readout area while following the variation in the position. As described above, faster readout can be performed as compared with the case in which all the pixels are read out by performing the binning readout in which a plurality of rows and a plurality of columns are read out at a time, thereby enabling more accurate light deflection angle control.

FIG. 28 is a schematic diagram illustrating a principle of skipping readout controlled by the light deflection angle detection control unit 7, in which a part (a) of FIG. 28 illustrates a pixel unit that is a readout target on the CMOS sensor 36 and a part (b) of FIG. 28 illustrates a positional relationship between the pixel unit that is the readout target and the spot light 39 of the light beam L.

In the example illustrated in the part (a) of FIG. 28, using the light deflection angle detection control signal $S_{dtct\_ctrl}$, an area 137g corresponding to one row of the pixel line is set as a readout area read out by the row direction shift register 38b, the two rows of the subsequent pixel line are set as a skipping area, and an area 137h corresponding to one row of the next pixel line is set as a readout area read out by the row direction shift register 38b. Similarly, an area 137j corresponding to one column of the pixel line is set as a readout area read by the column direction shift register 38a, the two columns of the subsequent pixel line are set as a skipping area, and an area 137k corresponding to one column of the next pixel line is set as a readout area read by the column direction shift register 38a. Through skipping readout, it is possible to decimate pixel lines of unnecessary rows and columns (areas without spot light) and read only pixel lines in the necessary area. As a result, since the number of pixel lines (the number of pixels) to be read is reduced as compared with the case in which all the pixels are read out, it is possible to perform readout at a higher speed.

Further, as illustrated in the part (b) of FIG. 28, setting of the readout skipping area in the skipping readout in the CMOS sensor 36 is controlled according to the position and the size of the spot light 39. Accordingly, it is possible to increase the frame rate in the CMOS sensor 36. In the part (b) of FIG. 28, control is performed to read one pixel line, skip two pixel lines, and then read one pixel line again in the row direction. Similarly, control is performed to read one pixel line, skip two pixel lines, and then read one pixel line again in the column direction. The size of the spot light 39 on the light reception surface on the CMOS sensor 36 is preset by the light source unit 1 that generates the spot light 39 and the optical system provided between the light source unit 1 and the CMOS sensor 36. That is, the size of the spot light 39 is set to a size equal to or larger than an area set as a pixel line skipped in the readout in the row direction and the column direction by skipping readout so that a two-dimensional position of the spot light 39 can be calculated with subpixel accuracy through one-dimensional centroid computation. For example, according to the example of the part (b) of FIG. 28, the size of the spot light 39 is set to be a size equal to or larger than the number of pixel lines (two pixel lines) that are readout-skipped in the row direction and the column direction. It should be noted that, in the detection signals $S_{outb}$ and $S_{outb}$ at this time, the output of the readout-skipped pixel line does not appear, and only the output of the read pixel line appears.

The light deflection angle detection control unit 7 sets a readout start address and a readout end address indicating information for designating a readout area in skipping readout and information for designating a readout skipping area in the light deflection angle detection control signal $S_{dtct\_ctrl}$ using the light deflection angle signal $S_{angle}$ and the operation control parameter. By setting of the readout start address and the readout end address indicating the readout area designation and readout skipping area designation, a number of the pixel lines to be read and a number of the pixel lines to be skipped in the readout are designated. In this case, in the case of the CMOS sensor 36, the readout area and the readout skipping area are designated in units of pixel lines by the column direction shift register 38a and the row direction shift register 38b. It should be noted that the size of the pixel line in the row direction and the column direction in this readout skipping area (the number of pixel lines to be skipped) is set so that the frame rate of the CMOS sensor 36 is equal to or higher than four times the resonance frequency of the light deflection unit 2. Further, the light deflection angle detection control unit 7 may acquire information on the position and the size on the light reception surface of the spot light 39 incident on the light reception surface on the CMOS sensor 36 on the basis of the light deflection angle signal $S_{angle}$. The light deflection angle detection control unit 7 may generate the light deflection angle detection control signal $S_{dtct\_ctrl}$ so that the skipping area in skipping readout is changed according to the acquired position and the acquired size of the spot light 39. Accordingly, even when the position of the spot light 39 varies to a position deviating from the readout area due to vibration or the like, it is possible to accurately calculate a centroid position by newly setting the readout area while following the variation in the position. By performing skipping readout in which unnecessary rows and columns are decimated as described above, it is possible to perform readout at a higher speed as compared with the case in which all the pixels are read out, and to perform more accurate light deflection angle control. Furthermore, the above-described partial readout may be used in combination in order to perform the skipping readout at a higher speed.

According to the modification example in which the CMOS sensor for acquisition of the dimensional projection data described above is adopted, a readout time can be shortened, and the CMOS sensor can be driven at a higher frame rate. Accordingly, light deflection angle control with higher speed and higher accuracy becomes possible.

Here, in the light beam irradiation device according to the above embodiment, the detection frequency of the position detection unit may be set to be equal to or higher than five times the resonance frequency of the light reflection unit. Also, the detection frequency of the position detection unit may be set to be equal to or higher than ten times the resonance frequency of the light reflection unit. By adopting such a configuration, the variation in the irradiation angle of the light beam can be further suppressed.

Further, the correction unit may correct the driving signal on the basis of the angle information on the angle of the reflection mirror calculated on the basis of the detection signal. Thus, it is possible to stably correct the irradiation angle of the light beam while following the resonance vibration of the reflection mirror.

Still further, the position detection unit may be a photodetector that includes a plurality of pixels and the photodetector may include a plurality of photodetection elements arranged for each of the pixels that output luminance information as a numerical value one-dimensionally or two-dimensionally.

In the light beam irradiation device according to the above embodiment, the driving signal may be a voltage signal or may be a current signal.

Further, the light beam irradiation device may further include a light branching unit that divides the light reflected by the reflection mirror, and the light reception surface of the position detection unit may receive the light divided by the light branching unit. When such a configuration is adopted, control of the irradiation angle can be realized without affecting the output intensity of the light beam.

Furthermore, a monitoring light source that emits monitoring light for monitoring may be further included, and the light reception surface of the position detection unit may receive monitoring light. When such a configuration is adopted, control of the irradiation angle can be realized without affecting the output intensity of the light beam.

Still further, the driving unit may include an elastic body connected to the reflection mirror and a coil connected to the reflection mirror via an elastic body, the driving signal may be supplied to the coil to swing the reflection mirror, and the resonance frequency may be determined according to characteristics of the driving unit including the elastic body, and the reflection mirror. In this case, when a configuration in which the elastic body and the coil are included as the driving unit is adopted, it is possible to sufficiently suppress a variation in the irradiation angle of the light beam while following the resonance vibration of the reflection mirror.

INDUSTRIAL APPLICABILITY

According to an aspect of the present invention, it is possible to sufficiently suppress a variation in the irradiation angle of the light beam using the light beam irradiation device that radiates a light beam.

REFERENCE SIGNS LIST

1 Light source unit (light source)
2 Light deflection unit (light reflection unit)
3 Light deflection angle detection unit (position detection unit)
4 Operation control unit (correction unit)
6 Measurement light source unit (monitoring light source)
7 Light deflection angle detection control unit
10, 10A, 10B, 10C Light beam irradiation device
21 Reflection mirror
22a, 22b Coil
23a, 23b Swing shaft (elastic body)
24 Driving unit
26 Light branching unit
33a Light reception surface 37*a* Column direction pixel (photodetector)
37*b* Row direction pixel (light detection unit)
L Light beam
$L_m$ Measurement light beam (monitoring light)

The invention claimed is:

1. A light beam irradiation device comprising:
a first light source configured to emit light;
a light reflector including a reflection mirror and a driver configured to swing the reflection mirror under supply of a driving signal, the light reflector receiving and reflecting the light emitted from the light source using the reflection mirror;
a position detector including a light reception surface receiving the light reflected by the reflection mirror, the position detector detecting a temporal change of a position of the light on the light reception surface at a frequency equal to or higher than four times a resonance frequency of the light reflector and outputting a detection signal indicating the temporal change; and
a controller configured to correct the driving signal on the basis of the detection signal and outputs the corrected driving signal to the light reflector.

2. The light beam irradiation device according to claim 1, wherein a detection frequency of the position detector is set to be equal to or higher than five times the resonance frequency of the light reflector.

3. The light beam irradiation device according to claim 1, wherein the detection frequency of the position detector is set to be equal to or higher than ten times the resonance frequency of the light reflector.

4. The light beam irradiation device according to claim 1, wherein the controller corrects the driving signal on the basis of angle information on an angle of the reflection mirror calculated on the basis of the detection signal.

5. The light beam irradiation device according to claim 1, wherein the position detector is a photodetector including a plurality of pixels, wherein the photodetector includes a plurality of photodetection elements outputting luminance information as a numerical value one-dimensionally or two-dimensionally arranged for each of the pixels.

6. The light beam irradiation device according to claim 1, wherein the driving signal is a voltage signal or a current signal.

7. The light beam irradiation device according to claim 1, further comprising a light branching device dividing the light reflected by the reflection mirror,
wherein the light reception surface of the position detector receives the light divided by the light branching device.

8. The light beam irradiation device according to claim 1, further comprising a monitoring light source configured to emit monitoring light for monitoring a deflection angle of the light emitted from the first light source,
wherein the light reception surface of the position detector receives the monitoring light.

9. The light beam irradiation device according to claim 1, wherein the driver includes an elastic body connected to the reflection mirror, and a coil connected to the reflection mirror via the elastic body, the driver swinging the reflection mirror by the driving signal being supplied to the coil, and
the resonance frequency is determined according to characteristics of the driver including the elastic body, and the reflection mirror.

* * * * *